(12) United States Patent
Ashrafi et al.

(10) Patent No.: US 11,063,472 B1
(45) Date of Patent: Jul. 13, 2021

(54) TOPOLOGY IDENTIFICATION AND STATE ESTIMATION OF POWER GRIDS

(71) Applicant: Topolonet Corporation, San Diego, CA (US)

(72) Inventors: Ashkan Ashrafi, San Diego, CA (US); Mohammad Rasouli, Erie, PA (US); Reza Sabzehgar, San Diego, CA (US)

(73) Assignee: Topolonet Corporation, San Diego, CA (US)

( * ) Notice: Subject to any disclaimer, the term of this patent is extended or adjusted under 35 U.S.C. 154(b) by 0 days.

(21) Appl. No.: 16/998,862

(22) Filed: Aug. 20, 2020

Related U.S. Application Data

(60) Provisional application No. 62/984,483, filed on Mar. 3, 2020.

(51) Int. Cl.
*H02J 13/00* (2006.01)
*G06F 17/11* (2006.01)
*G06Q 50/06* (2012.01)

(52) U.S. Cl.
CPC ........ *H02J 13/00002* (2020.01); *G06F 17/11* (2013.01); *G06Q 50/06* (2013.01)

(58) Field of Classification Search
None
See application file for complete search history.

(56) References Cited

U.S. PATENT DOCUMENTS 7,994,658 B2 * 8/2011 Cardinal ................. H02J 3/381
307/84
8,756,556 B1 6/2014 Raghunathan
(Continued)

FOREIGN PATENT DOCUMENTS

CN 102567603 B * 4/2015 ............. G06Q 50/06
CN 104967115 A * 10/2015 ................ H02J 3/00
(Continued)

OTHER PUBLICATIONS

Rocchetta et al., "Power Grid Robustness To Severe Failures: Topological and Flow Based Metrics Comparison", Jun. 2016, ECCOMAS Congress 2016, VII European Congress on Computational Methods in Applied Sciences and Engineering. (Year: 2016).*
(Continued)

*Primary Examiner* — Mohammad Ali
*Assistant Examiner* — Kelvin Booker
(74) *Attorney, Agent, or Firm* — MLO, a professional corp.

(57) ABSTRACT

A method involves receiving power data measurements at nodes of an electrical power grid, the electrical power grid having multiple buses. For a first bus of the electrical power grid, an objective function is repeatedly minimized using the received power data measurements to determine estimated admittances between the first bus and other buses of the electrical power grid. The minimization of the objective function is linearly constrained by a repeatedly estimated sum of conductances and susceptances connected to the first bus. A minimum value of the objective function for the first bus is determined that corresponds to a maximum value of the estimated sum of conductances and susceptances. A topology of the electrical power grid associated with the first bus is determined based on the estimated admittances that correspond to the minimum value of the objective function and to the maximum value of the estimated sum of conductances and susceptances.

21 Claims, 12 Drawing Sheets

(56) References Cited

U.S. PATENT DOCUMENTS

| | | | |
|---|---|---|---|
| 9,863,985 | B2 | 1/2018 | Giannakis et al. |
| 10,296,988 | B2 | 5/2019 | Mitra |
| 2012/0136638 | A1 | 5/2012 | Deschamps et al. |
| 2013/0262001 | A1 | 10/2013 | Sun et al. |
| 2014/0032138 | A1* | 1/2014 | Shrestha ................. G06F 11/30 702/58 |
| 2015/0051744 | A1* | 2/2015 | Mitra ....................... G06N 5/00 700/286 |
| 2015/0088439 | A1 | 3/2015 | Coffrin et al. |
| 2015/0199606 | A1* | 7/2015 | Raghunathan ........... G06N 5/04 706/53 |
| 2016/0048150 | A1 | 2/2016 | Chiang et al. |
| 2018/0158152 | A1* | 6/2018 | Jereminov ................ H02J 3/16 |
| 2019/0356131 | A1* | 11/2019 | Khodaei ................. H02J 3/383 |
| 2019/0372391 | A1 | 12/2019 | Frame et al. |
| 2020/0003811 | A1* | 1/2020 | Jaton ....................... H04L 12/10 |
| 2020/0021133 | A1* | 1/2020 | Liu ..................... G01R 19/2513 |
| 2020/0042569 | A1* | 2/2020 | Kourounis .............. G06F 17/11 |
| 2020/0184308 | A1* | 6/2020 | Li ......................... G05B 13/027 |
| 2020/0353835 | A1* | 11/2020 | Al-Awami ........... G01R 31/382 |

FOREIGN PATENT DOCUMENTS

| | | | | | |
|---|---|---|---|---|---|
| JP | 2013176281 | A | * | 9/2013 | ................ H02J 3/00 |
| JP | 201439463 | A | * | 2/2014 | ................ H02J 3/00 |
| JP | 2014166132 | A | * | 9/2014 | ................ H02J 3/00 |
| JP | 2016077138 | A | | 5/2016 | |
| WO | 2019053588 | A1 | | 3/2019 | |

OTHER PUBLICATIONS

Poudel et al., "Electrical Distance Approach for Searching Vulnerable Branches During Contingencies", Jul. 2018, IEEE Transactions on Smart Grid, vol. 9, No. 4. (Year: 2018).*

Park et al., "A Sparse Tableau Formulation for Node-Breaker Representations in Security-Constrained Optimal Power Flow", Mar. 2018, IEEE Transactions on Power Systems, vol. 34, No. 1. (Year: 2018).*

Cotilla-Sanchez et al., "Comparing the Topological and Electrical Structure of the North American Electric Power Infrastructure", Dec. 2011, Pennsylvania State University. (Year: 2011).*

Ian Dobson, "Voltages Across an Area of a Network", May 2012, IEEE Transactions on Power Systems, vol. 27, No. 2. (Year: 2012).*

Dubey et al., "Decoupled Three-Phase Load Flow Method for Unbalanced Distribution Systems", Oct. 2012, IEEE International Conference on Power System Technology (POWERCON). (Year: 2012).*

Cuadra et al., "A Critical Review of Robustness in Power Grids Using Complex Networks Concepts", May 2015, Energies 2015, 8, 9211-9265; doi:10.3390/en8099211. (Year: 2015).*

Anwar et al., Estimation of Smart Grid Topology using SCADA Measurements, 2016 IEEE International Conference on Smart Grid Communications (SmartGridComm): Cyber Security and Privacy for the Smart Grid, Nov. 2016, pp. 539-544.

Ardakanian et al., On Identification of Distribution Grids, IEEE Transactions on Control of Network Systems, vol. 6, No. 3, Sep. 2019, pp. 950-960.

Arya et al., Inferring Connectivity Model from Meter Measurements in Distribution Networks, e-Energy '13: Proceedings of the fourth international conference on Future energy systems, May 2013, pp. 173-181, https://doi.org/10.1145/2487166.2487186.

Babakmehr et al, Compressive Sensing-Based Topology Identification for Smart Grids, IEEE Transactions on Industrial Informatics, vol. 12, No. 2, Apr. 2016, pp. 532-543.

Bolognani et al., Identification of power distribution network topology via voltage correlation analysis, 52nd IEEE Conference on Decision and Control, Dec. 10-13, 2013, pp. 1659-1664.

Erseghe et al., Topology Estimation for Smart Micro Grids via Powerline Communications, IEEE Transactions on Signal Processing, vol. 61, No. 13, Jul. 1, 2013, pp. 3368-3377.

Li et al, Blind Topology Identification for Power Systems, 2013 IEEE International Conference on Smart Grid Communications (SmartGridComm), Vancouver, BC, Oct. 21-24, 2013, pp. 91-96.

Ponce and Bindel, FliER: Practical Topology Update Detection Using Sparse PMUs, IEEE Transactions on Power Systems, vol. 32, No. 6, Nov. 2017, pp. 4222-4232.

Rogers et al., Identification of Power System Topology from Synchrophasor Data, IEEE/PES Power Systems Conference and Exposition, Mar. 2011, pp. 1-8.

Watson et al., Use of smart-meter data to determine distribution system topology, The Journal of Engineering, vol. 2016, No. 5 May 2016, pp. 94-101.

Weng et al., Distributed Energy Resources Topology Identification via Graphical Modeling, IEEE Transactions on Power Systems, vol. 32, No. 4, Jul. 2017, pp. 2682-2694.

Zupanovic et al., Kirchhoffs Loop Law and the maximum entropy production principle, Phys. Rev. E. Voi 70, Issue 5, Nov. 2004, 5 pages.

International Search Report dated Jun. 4, 2021 for PCT Patent Application No. PCT/IB2021/051649.

\* cited by examiner

```
 1: Inputs:
      ŵ_m = arg min ||Ĥ_m ŵ_m − b̂_m||_2,
             w_m, ŝ_m ≥ 0
      λ_m^0 = g_m^T ŵ_m,
      e_1 = ||Ĥ_m ŵ_m − b̂_m||_2,
      s_min                                              ▷ Minimum step size allowed
      e_max = 10^−3                                      ▷ Maximum acceptable error
 2: if (e_1 > e_max) then
 3:     λ_m ← λ_m^0
 4:     e_1 ← ∞
 5:     s ← s_0                                          ▷ Initial step size s_0
 6:     while s > s_min do
 7:         λ_m ← λ_m + s                                ▷ Increment λ_m by the step size
 8:         Solve (17) to find y_m and the optimization error ξ_m
 9:         e_2 ← ξ_m
10:         if (e_2 > e_1) ∧ (e_2 > e_max) then
11:             λ_m ← λ_m − s
12:             s ← s/10
13:         else
14:             e_1 ← e_2
15:         end if
16:     end while
17: else
18:     λ_m ← λ_m^0
19:     y_m ← ŵ_m
20: end if
21: Outputs:
      w_m = y_m(1 : 2N)
      x_m = −C_m w_n
      G_{m,s} = x_m^T(1 : N), G_{s,m} = x_m(1 : N)
      B_{m,s} = x_m^T(N + 1 : 2N), B_{s,m} = x_m(N + 1 : 2N)
```

TOPOLOGY IDENTIFICATION AND STATE ESTIMATION OF POWER GRIDS

RELATED APPLICATIONS

This application claims priority to U.S. Provisional Patent Application No. 62/984,483 filed on Mar. 3, 2020, and entitled "Topology Identification and State Estimation of Power Grid", all of which is hereby incorporated by reference for all purposes.

BACKGROUND

The topology of an electrical power grid generally identifies the configuration of that electrical power grid (from power generation sources to consumer endpoints, all transmission or distribution lines and other components in between, e.g., circuit breakers and disconnect switches). Power grid managers typically maintain the grid using state estimation software, which relies on the topology information that is typically obsolete by days or even minutes. This is because identification of the topology of a power grid has typically been done with a combination of manually entered or telemetered information, which may be infrequently updated (e.g., weekly or after a bus, transmission line or another component is added, replaced or removed or due to malfunctioning telemetry devices). However, the state of the grid can change rapidly due to intentional maintenance and repairs, changes in power demand, frequent changes in power available from renewable power sources (such as solar and wind), downed power lines during high winds or heavy precipitation, among many other potential causes. If the current topology of the electrical power grid system is not known, then operation will likely be inefficient at best and potentially dangerous at worst. Attempts have been made to automatically identify the topology, but these solutions have been incomplete, slow and/or inadequate.

High levels of reliability and flexibility in smart grids cannot be achieved without substantial improvements in topology identification algorithms and computational methods for determining the topology and estimating the states of the power grid. The need for enhanced topology identification algorithms and state estimation becomes greater with high penetration of renewable energy of an intermittent and distributed nature with steep short-term ramps of electricity generation distributed throughout the power grid.

Topology identification is significant for fault detection and outage management, and is used to detect errors in the status of components of the power grid such as switches and substation configuration. Real-time contingency analysis, line outage detection, and fault detection all depend on accurate topology identification and parameter estimation. Also, distribution system automation, analysis and coordination of distribution networks, especially in the presence of increasing usage of photo-voltaic device installations (PVs) and other Distributed Energy Resources (DERs), rely on accurate models of the electrical power grid system. Inaccurate topology information has repeatedly been the cause of wrong state estimations.

Topology identification becomes more pressing when this information is used for real-time operation of power distribution networks. At this level of the electrical power grid, reconfiguration occurs more frequently. However, current topology identification methods have limited capabilities.

There are several concerns with respect to topology identification that pose various issues. For example, one concern is the use of linear approximations (i.e., using linearized power flow equations for simplicity) by most existing topology identification methods. Another concern is the assumption of a radial configuration of the electrical power grid system by most existing techniques at the distribution level. Another concern is cybersecurity, since a majority of typical cyber-attacks attempt to change the topology information, which can result in mismanagement and damage to components of the power grid. Thus, accurate identification of cyber-attacks necessitates a modern topology identification method for the smart grid.

Another concern is the off-line versus on-line status of renewable and distributed power generation resources. Due to rapidly growing renewable and distributed generation resources, where the electrical power grid configuration is subject to quick changes in sunlight and wind, it is vital to detect the topology and network configuration accurately for power dispatch purposes. In most approaches that use correlation information, a record of network data over a relatively long period of time is required, and thus may not be suitable for applications in which real-time data is needed. Incorrect information of transmission line statuses have caused blackouts because overloaded lines were not detected as the network configuration was not up-to-date and resulted in erroneous state estimations. Therefore, developing on-line tools that infer the updated structure, needed for operational reliability studies, is a necessity.

Another concern is the quantity and availability of data, e.g., from phasor measurement units (PMUs) and Advanced Metering Infrastructure devices (AMIs). Current PMUs and AMIs produce detailed data at high data rates, which poses a challenge for computational efficiency compared to the relatively slow data rate of conventional Supervisory Control And Data Acquisition (SCADA) systems. Furthermore, in the current structure of most power grids, many of the new measurement and sensing resources are not exploited properly.

In the state-of-the-art methods, enormous efforts have been made by researchers to address grid topology identification, cybersecurity, state estimation, and stability of the smart grid, mainly using PMU and AMI data. Also, fault detection, identification and location in smart grids have been studied with respect to features extracted from time-frequency domain data, and by employing a linear weighted least-squares method. However, accurate topology identification of network-structured (mesh) power grids and bus admittance matrix estimation remain immature, case-specific, and a work in progress even though it is an urgent need. For power transmission systems, the Generalized State Estimator (GES) approach has been used to estimate bus voltages and breaker statuses. The GES approach has been extended to power distribution systems. The data for topology identification of distribution systems may be obtained from micro-PMUs, or AMIs since the PMUs are not common in distribution systems. In power distribution systems, especially for residential power feeders, often the network topology is unknown due to the lack of information from passive switches. Inaccurate network topology, i.e. connectivity information, and component parameters are some of the most common errors in Geographical Information Systems (GIS). Low voltage grids have recently received more attention due to increasing usage of DERs and new dispatchable loads such as electric vehicles. Smart meter data has been used for determining distribution system topology. Voltage correlation can be utilized to identify both network connectivity and parameters. A disadvantage of correlation-based methods, which is very common, is that the correlation is higher in low impedance grids. Pearson correlation coefficient and geographical location have been used for clustering. Voltage correlation techniques have been used in some applications. Voltage correlation information, obtained from a SCADA system, has been combined with data attained from customer meter data. Cross-correlation of voltage magnitudes and phase differences have been employed. Radial network topology has been estimated based on voltage correlations from a relatively large number of samples when the measurement noise is relatively small. Wavelets have been used for clustering customers during topology identification. Various other modifications have been proposed to estimate parameters of a distribution system from smart-meter data using an approximate linearized voltage drop and linear regression. Smart meter energy measurement data has been exploited to infer network topology by the application of Principal Component Analysis (PCA). Radial secondary circuit topology has been estimated from both voltage and power measurement data available through AMIs. Formulation of topology identification as a Sparse Recovery Problem (SRP) has been described. A linearized small-signal model of a power system, and the theory of quickest change detection to detect single-line and double-line outages from PMU data have been considered. In each of these cases, however, topology identification has generally been incomplete, slow, and/or inadequate.

SUMMARY

In some embodiments, a method involves receiving power data measurements at nodes of an electrical power grid, the electrical power grid having multiple buses. For a first bus of the electrical power grid, an objective function is repeatedly minimized using the received power data measurements to estimate admittances between the first bus and other buses of the electrical power grid. The minimization of the objective function is linearly constrained by a repeatedly estimated sum of conductances and susceptances connected to the first bus. A minimum value of the objective function is determined where the minimum value of the objective function corresponds to a maximum value of the estimated sum of conductances and susceptances for the first bus. A topology of the electrical power grid associated with the first bus is determined based on the estimated admittances that correspond to the minimum value of the objective function and to the maximum value of the estimated sum of conductances and susceptances.

In some embodiments, a method involves receiving power data measurements from multiple phasor measurement units (PMUs) at nodes of an electrical power grid, the electrical power grid having multiple buses. For a first bus of the electrical power grid, an objective function is repeatedly minimized at an energy management system of the electrical power grid using the received power data measurements to estimate admittances between the first bus and other buses of the electrical power grid. The minimization of the objective function is linearly constrained by a repeatedly estimated sum of conductances and susceptances connected to the first bus. A minimum value of the objective function is determined that corresponds to a maximum value of the repeatedly estimated sum of conductances and susceptances for the first bus. A topology of the electrical power grid associated with the first bus is determined at the energy management system based on the estimated admittances that correspond to the minimum value of the objective function and to the maximum value of the estimated sum of conductances and susceptances for the first bus.

BRIEF DESCRIPTION OF THE DRAWINGS

FIG. 10 is simplified pseudocode of the example process for use in determining the topology of an electrical power grid, in accordance with some embodiments.

DETAILED DESCRIPTION

Figure 1:
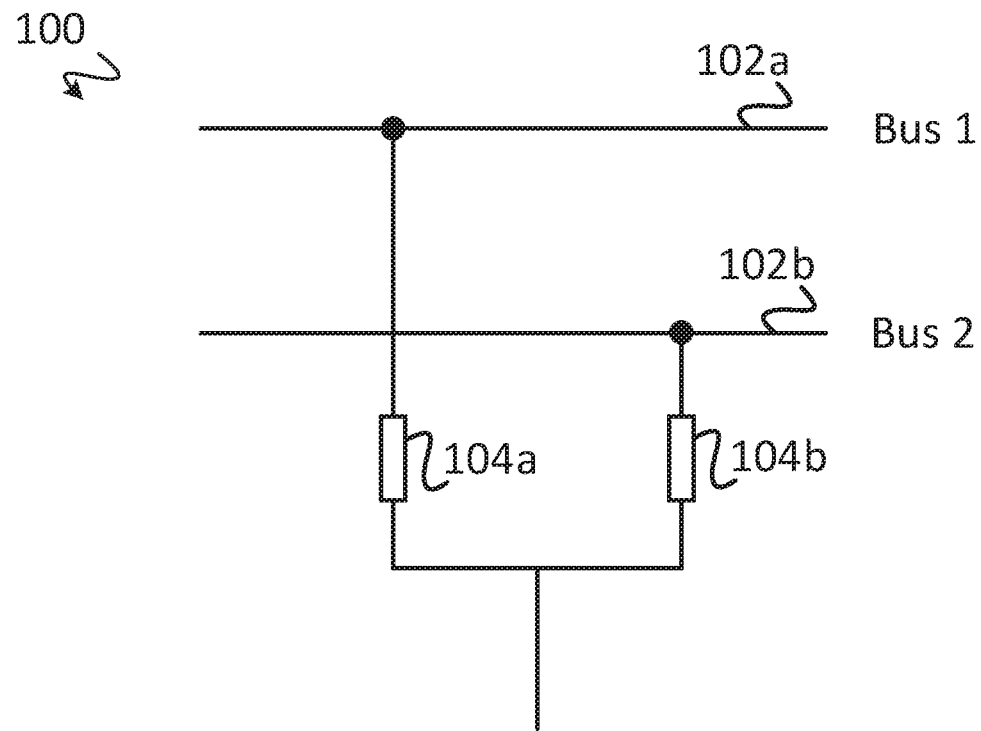
FIG. 1 is a simplified schematic of a portion of a conventional electrical power grid.

The future power grid, known as the smart grid, aims for high efficiency, reliability, security, and affordability with more support for consumer participation as compared to conventional electrical power grid systems. Every analysis, planning, operation, reconfiguration, and real-time power dispatch of the smart grid relies on accurate topology and state information of the overall power grid, and upon parameters of the electrical power system.

A smart grid, even though more complex than a conventional electrical power grid, will be well equipped with advanced digital technology, such as Phasor Measurement Units (PMUs) in the transmission system for wide area visibility, and Advanced Metering Infrastructure (AMI) in the distribution system for demand response and dynamic pricing. Such devices provide detailed data at a much higher rate than traditional Supervisory Control And Data Acquisition (SCADA) systems. The high-resolution collected data provides the opportunity for real-time applications to enhance operational efficiency, e.g., voltage and load forecast improvements and parameters estimation of power distribution networks.

According to embodiments of the present invention, the availability of detailed power grid topology data can be exploited in near real-time to observe and foresee the evolving behavior of the power grid, detect potential risks, and prevent wide-spread power outages such as blackouts that can result in billions of dollars in damages to a region. Embodiments of the present invention enable a reliable, efficient, and real-time method for (i) accurate grid topology identification, and (ii) fast-converging algorithms for on-line network parameters estimation. The described approach significantly improves the reliability of the electrical power grid and assists to determine more realistic operating limits as compared to existing conservative approaches. For this purpose, real-time data, collected from the measurement devices, e.g., PMUs that are embedded in the structure of the electrical power grid, are utilized. The PMUs are typically connected to Global Positioning Satellite (GPS) devices, so that the data from the PMUs is time-synchronized. High-precision time-stamped data is obtained from the PMUs at a rate of at least 30 samples per second. PMU data can be transmitted over a communications network in real-time and collected at a centralized device, i.e., a Phasor Data Concentrator (PDC). PMU data typically includes power data measurements such as voltage, current, phase, and/or frequency.

In some embodiments, both the electrical power grid topology and state variables are constructed from such data. Additionally, the technique described herein does not assume prior knowledge of switch conditions or grid admittance. In general, the technique described herein primarily uses the voltage, phase and total branch power information at different buses in the grid, as measured by the PMUs. The PMUs transmit this data to a central server or a combination of computer devices for the process described below.

In general, embodiments of the present invention produce topology identification information and electrical power grid parameters, that accurately represent the smart grid structure and admittance matrix for real-time purposes. The admittance matrix generally defines the topology of a grid and its parameters. The technique described herein includes efficient and reliable approaches and algorithms that can be used to obtain the topology information of a general class of power grids rather than a particular network. The technique described herein is operable to identify the topology of the electrical power system with 100-percent accuracy. As a result, real-time and accurate power system structure detection is enabled, which is suited for a wide range of power dispatch considerations, planning, and operation.

This new class of decision-support topology identification method can be used for handling dynamic power dispatch, significant improvements in reliability, cybersecurity, and stability, among other purposes. As described below, validation and verification of the present technique has been performed using simulations on various test benches such as standard IEEE test cases.

The following description of embodiments of the present invention enables technology that effectively and accurately determines the topology of an electrical power grid in real-time (i.e., sufficiently timely response for rapid decision-making for power grid operations). Nonlinear power balance equations (not simplified ones such as linear approximations or a DC power model) are used. Additionally, some embodiments use any type of power network configuration (radial or non-radial), which makes the present invention suitable for both balanced transmission and unbalanced distribution networks. Furthermore, the technique described herein performs a bus admittance matrix estimation that leads to accurate results for a wide range of operation.

A simplified single-line diagram of a portion 100 of an electrical power grid is shown in FIG. 1. The portion 100 of the electrical power grid generally includes a first bus 102a, a second bus 102b, a first high-voltage breaker 104a, and a second high-voltage breaker 104b. If both high-voltage breakers 104a-b are closed, the first bus 102a and the second bus 102b form a single bus. If either of the high-voltage breakers 104a-b are open, then the portion 100 of the electrical power grid will include two nodes. Thus, a topology of the portion 100 of the electrical power grid is changed by the state of each of the high-voltage breakers 104a-b.

Figure 2:
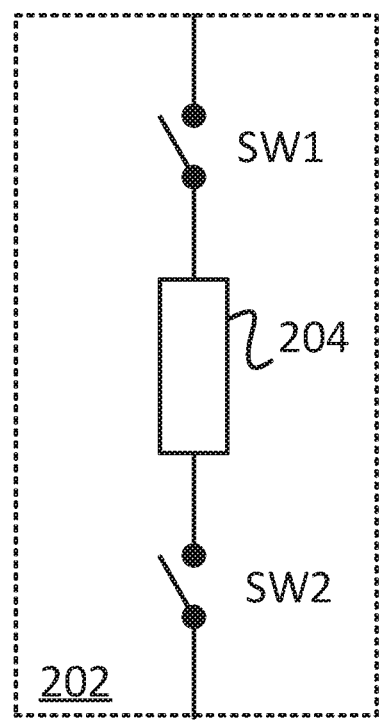
FIG. 2 is a simplified schematic providing details of a conventional high-voltage breaker of a portion of the conventional electrical power grid shown in FIG. 1.

High-voltage breaker statuses (e.g., whether open or closed) of an electrical power grid are typically telemetered. As such, network topology changes due to a state change of the high-voltage breakers 104a-b of the electrical power grid is typically known. However, often high-voltage breakers of the electrical power system are surrounded by un-telemetered disconnect switches. For example, FIG. 2 includes a simplified circuit 202 that includes a high-voltage breaker 204 surrounded by a first disconnect switch SW1 and a second disconnect switch SW2. Either or both of the high-voltage breakers 104a-b of FIG. 1 could be realized as the circuit 202. Because a state of one or both of the disconnect switches SW1, SW2 is not telemetered, an unreported switch state may result in an error in topology of the electrical power grid. Such errors in topology may lead to a divergence in state estimators of the electrical power system. The technique described herein advantageously resolves this issue using a process that uses PMUs data (including magnitude and phase) to determine the topology of the electrical power grid in real-time, or close to real-time, and thereby quickly recognizing topology changes due to un-telemetered components of the electrical power system such as the switches SW1 and SW2.

Figure 3:
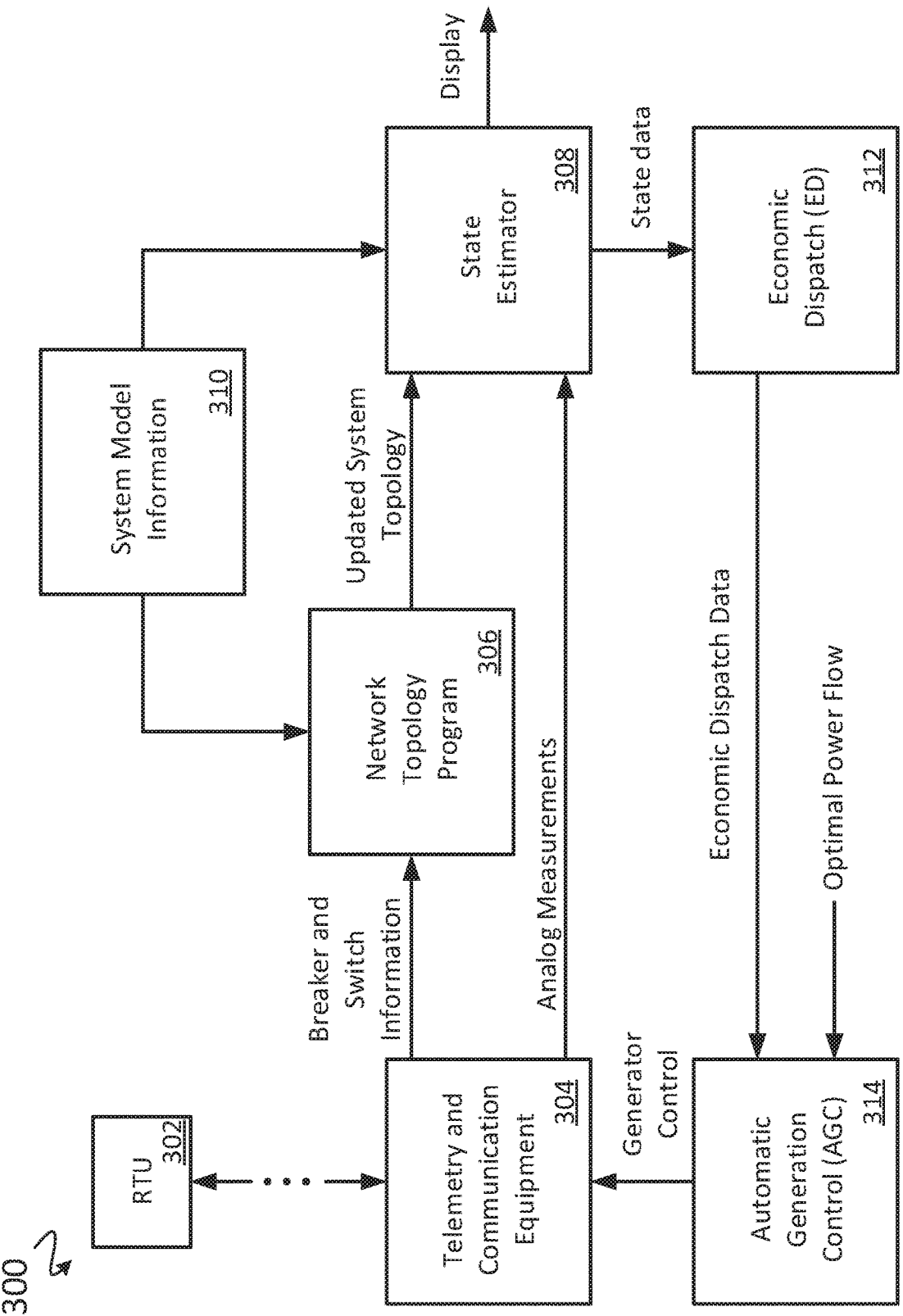
FIG. 3 is a simplified diagram of an energy control center architecture of an electrical power grid.

A simplified conventional architecture of an energy control center 300 of an electrical power system is shown in FIG. 3 to illustrate how topology information is related to state estimation programs and how state estimation affects electrical power generators of the power system. The energy control center 300 generally includes multiple remote terminal units 302, telemetry and communication equipment 304, a network topology program unit 306, a state estimator unit 308, a system model information unit 310, an economic dispatch (ED) unit 312, and an automatic generation control (AGC) unit 314. As shown, the telemetry and communication equipment 304 provides breaker and switch information to the network topology program unit 306 (e.g., based on manual inputs from a network technician or telemetered information). The network topology program unit 306 uses the received breaker and switch information to provide updated system topology information to the state estimator unit 308. In conventional energy control center architectures, updating system topology information is infrequent (e.g., weekly or after a bus, transmission line or other component is added, replaced or removed) and typically requires manual inputs. The state estimator unit 308 displays electrical power grid state information (e.g., to a display or other reporting software or systems) and provides state data to the economic dispatch unit 312. The economic dispatch unit 312 determines a short-term optimal output for a number of electricity generation facilities of the electrical power grid to meet system load at lowest possible cost and provides economic dispatch data to the automatic generation control unit 314. The automatic generation control unit 314, upon receiving the economic dispatch data and optimal power flow data (e.g., a determination of a best operating level for electrical power plants of the electrical power grid), provides generator control data to the telemetry and communication equipment 304 to adjust power generation (i.e., raise or lower) in the electrical power grid as well as to provide power generation status data. Thus, if the state estimator unit 308 receives updated system topology that does not reflect an accurate topology of the electrical power grid (e.g., due to slow, manual updates or un-telemetered equipment), the state estimator unit 308 will provide incorrect state data to the economic dispatch unit 312, ultimately resulting in generator control data produced from the automatic generation control unit 314 which may cause electrical power generators of the power grid to produce an incorrect amount of power or cause overloading transmission lines.

Figure 4:
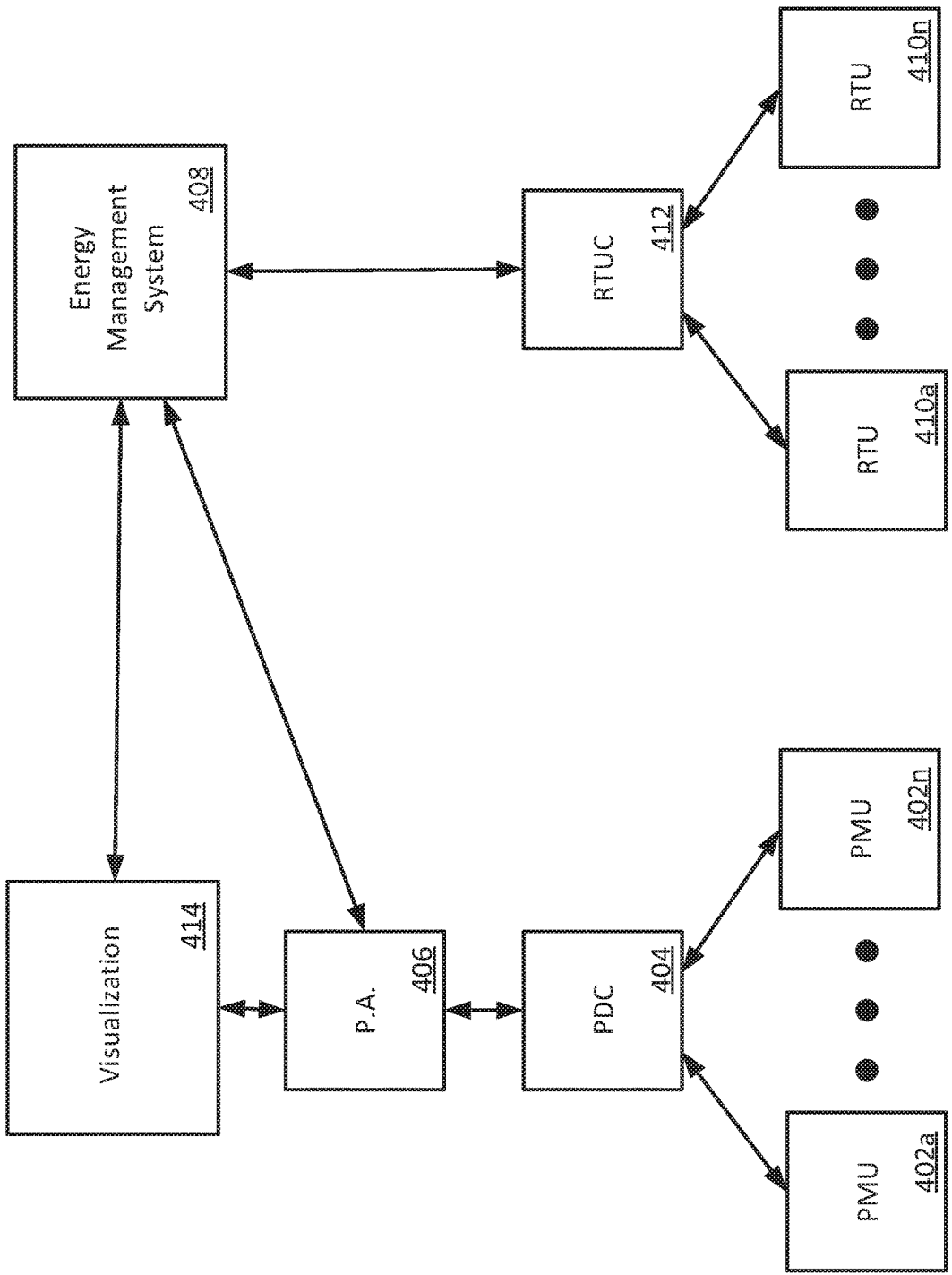
FIG. 4 is a simplified diagram of an energy management architecture of an electrical power grid.

FIG. 4 provides a simplified portion of modern architecture 400 of an electrical power grid, in accordance with some embodiments. The modern architecture 400 generally includes multiple PMUs 402a-n, phasor data concentrators (PDC) 404, phasor analysis (P.A.) units 406, an energy management system 408, remote terminal units (RTUs) 410a-n, remote terminal unit concentrators (RTUC) 412, and visualization units 414. The PMUs 402a-n and RTUs 410a-n are distributed throughout the electrical power grid. The RTUs 410a-n are microprocessor-controlled devices that interface physical elements of the electrical power grid to a distributed control system (e.g., SCADA) by transmitting telemetry data to a master system. Power data measurements produced at the PMUs 402a-n are received at the PDC 404, and data produced at the RTUs 410a-n is received at the RTUC 412. The PDC 404 provides aggregated power data measurements to the P.A. 406 which provides magnitude and phase information to the visualization unit 414 and to the energy management system 408. Similarly, the RTUC 412 provides aggregated data from the RTUs 410a-n to the energy management system 408. The technique disclosed herein advantageously "taps into" such already existing data provided by the PMUs 402a-n to automatically determine a topology of the electrical power grid of the architecture 400 as compared to conventional processes, which typically rely upon data only from the RTUs 410a-n. Additionally, each of the PMUs 402a-n is operable to receive commands and/or other data from the PDC 404. The PDC 404 is operable to receive commands and/or other data from the P.A. 406, and the P.A. 406 is operable to receive commands and/or data from the visualization unit 414 and the energy management system 408. Similarly, each of the RTUs 410a-n is operable to receive commands and/or data from the RTUC 412, and the RTUC 412 is operable to receive commands and/or data from the energy management system 408.

The relationship between voltages, currents and powers drawn from or injected to each bus of an electric power network or grid is generally governed by the nonlinear Power Balance Equations (PBE) (1a) and (1b):

$$P_m(t) = \sum_{n=1}^{N} V_m(t)V_n(t)(G_{mn}\cos(\theta_m(t) - \theta_n(t)) + B_{mn}\sin(\theta_m(t) - \theta_n(t))) \quad (1a)$$

$$Q_m(t) = \sum_{n=1}^{N} V_m(t)V_n(t)(G_{mn}\sin(\theta_m(t) - \theta_n(t)) - B_{mn}\cos(\theta_m(t) - \theta_n(t))) \quad (1b)$$

where $P_m$, $Q_m$, $V_m$, and $\theta_m$ are active power, reactive power, voltage and phase, respectively, of the $m^{th}$ bus of the power grid, and N is the total number of buses in the electrical power grid. Thus, the power balance equations (1a) and (1b) describe the relationship between active and reactive power, voltage, admittances, and phases of a transmission grid at each station or bus. The values $G_{mn}$ and $B_{mn}$ are the real (conductance) and imaginary (susceptance), respectively, parts of the admittance between the $m^{th}$ bus and the $n^{th}$ bus. The terms "real" and "imaginary" refer to conventional mathematical concepts, rather than as to whether the parts of the admittance exist in the real world. The parameter t represents the time of the measurements, which are sampled with a sampling frequency of $T_s$, i.e., $t=kT_s$. Thus, matrices G and B are defined to have the entries of $G_{mn}$ and $B_{mn}$, respectively. The matrices G and B are typically both symmetric.

To show equations (1a) and (1b) in matrix form, vectors $c_m(k)$; $s_m(k) \in \mathbb{R}^{N \times 1}$ are defined as follows in equations (2a) and (2b), in which t is replaced with k to enumerate the time samples:

$$c_m^T(k) = [V_m(k)V_1(k)\cos(\theta_m(k) - \theta_1(k)), \ldots, V_m(k)V_N(k)\cos(\theta_m(k) - \theta_N(k))] \quad (2a)$$

$$s_m^T(k) = [V_m(k)V_1(k)\sin(\theta_m(k) - \theta_1(k)), \ldots, V_m(k)V_N(k)\sin(\theta_m(k) - \theta_N(k))] \quad (2b)$$

Therefore equations (1a) and (1b) can be shown as equations (3a) and (3b):

$$P_m(k) = c_m^T(k)[G_{m1}, G_{m2}, \ldots, G_{mN}]^T s_m^T(k)[B_{m1}, B_{m2}, \ldots, B_{mN}]^T \quad (3a)$$

$$Q_m(k) = s_m^T(k)[G_{m1}, G_{m2}, \ldots, G_{mN}]^T c_m^T(k)[B_{m1}, B_{m2}, \ldots, B_{mN}]^T \quad (3b)$$

Additionally, Since G, $B \in \mathbb{R}^{N \times N}$ are symmetric matrices (in the absence of phase shifters), equations (3a) and (3b) can be rewritten as equations (4a) and (4b):

$$P_m(k) = [c_m^T(k)s_m^T(k)][G_{m1}, G_{m2}, \ldots, G_{mN}, B_{1m}, B_{2m}, \ldots, B_{Nm}]^T \quad (4a)$$

$$Q_m(k) = [s_m^T(k) - c_m^T(k)][G_{m1}, G_{m2}, \ldots, G_{mN}, B_{1m}, B_{2m}, \ldots, B_{Nm}]^T \quad (4b)$$

or as equations (5a) and (5b):

$$P_m(k) = [c_m^T(k)s_m^T(k)][G_{*m}^T, B_{*m}^T]^T \quad (5a)$$

$$Q_m(k) = [s_m^T(k) - c_m^T(k)][G_{*m}^T, B_{*m}^T]^T \quad (5b)$$

where $G_{*m}$ and $B_{*m}$ are the $m^{th}$ columns of the matrices G and B, respectively.

Additionally, assuming according to equation (6) that:

$$x_m = [G_{*m}^T, B_{*m}^T]^T \in \mathbb{R}^{2N \times 1} \quad (6)$$

then equations (5a) and (5b) can be shown in a matrix form in equation (7) as:

$$A_m x_m = b_m \quad (7)$$

where $b_m$ and $A_m$ are provided in equation (8) as:

$$b_m = \begin{bmatrix} P_m(k) \\ Q_m(k) \end{bmatrix} \in \mathbb{R}^{2M \times 1} \text{ and } A_m = \begin{bmatrix} c_m^T(k) & s_m^T(k) \\ s_m^T(k) & -c_m^T(k) \end{bmatrix} \in \mathbb{R}^{2M \times 2N}, \quad (8)$$

and M is the number of samples. Thus, the solution of equation (7), as a rearrangement of the nonlinear power balance equations in a matrix form, provides the values $G_{*m}$ and $B_{*m}$.

In some embodiments, equation (7) is an overdetermined system of equations if M>N, but since matrix $A_m$ is rank deficient, it potentially has infinite solutions. Moreover, with a small amount of uncertainty or error, matrix $A_m$ becomes full rank and equation (7) becomes an inconsistent equation and will not have any solution. In either case, the least squares solution (obtained by a Moore-Penrose pseudo-inverse) will provide an approximate solution that contains significant error due to the large sparsity of the vector $x_m$. Therefore, in some embodiments, additional constraints and equations are advantageously selected to solve this problem, which are given as follows.

In some embodiments, sign constraints are provided. For example, in some embodiments, the values of $G_{*m}$ are all negative except the diagonal entries $G_{mm}$, and the values of $B_{*m}$ are all positive except the diagonal entries $B_{mm}$. This case can be shown as the following linear constraint in equation (9):

$$C_m x_m \leq 0, \quad (9)$$

where $C_m$ is a diagonal matrix defined in equation (10) as:

$$C_m = [{}^{diag(E*m)}{}_{0 - diag(E*m)}{}^0], E = (1_N 1_N^T - 2I_N), \quad (10)$$

where $I_N$ is the identity matrix of order N, and $1_N$ is a N×1 column vector with all "1" entries.

In some embodiments, a constraint is advantageously provided for the maximization of the sum of the conductances and susceptances of all connections to the $m^{th}$ bus or node. This constraint has not been used in conventional techniques but has been found to enable a significant improvement in topology identification. For example, if $x_m(k)$ is the $k^{th}$ entry of the vector $x_m$, then $x_m(m) = G_{mn}$ includes the sum of all line conductances connected to bus m plus the conductance of bus m to the ground ($g_{mg}$). Moreover, $x_m(N+m) = B_{mm}$ includes the sum of all line susceptances connected to bus m plus the susceptances of bus m to the ground ($b_{mg}$). These two concepts can be shown in equations (11a) and (11b) as:

$$x_m(m) = g_{mg} - \sum_{\substack{i=1 \\ i \neq m}}^{N} x_m(i) \quad (11a)$$

$$x_m(m+N) = b_{mg} - \sum_{\substack{i=N+1 \\ i \neq N+m}}^{2N} x_m(i). \quad (11b)$$

It should be noted that $x_m(m)$ is positive and $x_m(m+N)$ is negative. Therefore, out of possibly infinite solutions to equation (7) under the constraint of equation (9), the solution that maximizes $G_{mm} - B_{mm} = x_m(m) - x_m(m+N)$ is the desired solution to the problem, i.e., provides the actual values of $G_{*m}$ and $B_{*m}$. This result can be presented as an optimization problem whose objective function is shown in equation (12) as:

$$J(x_m) = g_m^T x_m \quad (12)$$

where $g_m = e_m - e_{m+N}$, and $e_k$ is a column vector with all zero entries except the $k^{th}$ entry. In the section "JUSTIFICATION FOR MAXIMIZATION OF SUM OF CONDUCTANCES AND SUSCEPTANCES" below, it is shown why equation (12) should be maximized, in accordance with some embodiments.

The above problem and conditions/constraints can be summarized into the following optimization problem of equation (13):

$$\begin{aligned} \underset{x_m}{\text{maximize}} \quad & g_m^T x_m \\ \text{s.t.} \quad & C_m x_m \leq 0, \\ & A_m x_m = b_m, \end{aligned} \quad (13)$$

The solution of equation (13) gives the topology of the electrical power grid around the $m^{th}$ bus. To find the topology of the entire grid the same process should be repeated for every bus on the grid.

However, the optimization problem of equation (13) generally cannot find the solution when there is error in the measurements of the voltage magnitudes, phasors, and active and reactive powers. Thus, for the case of measurement error, an alternative method that is robust to noise is provided.

Noise Consideration

The condition of equation (7) is generally satisfied when there is no noise in the system. In fact, the result is 100% accurate if there is no noise. With noise in the system, however, the equality of equation (7) does not hold, so the optimization problem of equation (13) is reformulated as equation (14), which is robust to noise:

$$\begin{aligned} \underset{w_m}{\text{minimize}} \quad & -g_m^T w_m + \alpha \|H_m w_m - b_m\|_p \\ \text{s.t.} \quad & w_m \geq 0 \end{aligned} \quad (14)$$

where $w_m = -C_m x_m$, $H_m = -A_m C_m$, and the norm value p can be 1, 2 or ∞. (The equality constraint of equation (13) for $A_m x_m = b_m$ is not exact for equation (14).) Additionally, the solution uses the fact that $C_m^2 = I_N$. To keep equation (14) a linear program, either p=1 or p=∞ is selected as the norm value. One-norm is more suitable to optimize for $w_m$, because infinity-norm will result in uniform minimax error for the entries of x, hence p=1. Therefore, equation (14) can be converted to the linear program of equation (15):

$$\begin{aligned} \underset{y_m}{\text{minimize}} \quad & q_m^T y_m \\ \text{s.t.} \quad & \begin{bmatrix} H_m & -I_{2M} \\ -H_m & -I_{2M} \\ -I_{2N} & 0_{2N \times 2M} \end{bmatrix} y_m \leq \begin{bmatrix} b_m \\ -b_m \\ 0_{2N \times 1} \end{bmatrix} \end{aligned} \quad (15)$$

where, according to equation (16):

$$y_m = [w_m^T r_m^T]^T$$

$$g_m = [-g_m^T \alpha 1_{1 \times 2M}]^T$$

$$r_m \in \mathbb{R}^{2M \times 1} \quad (16)$$

and $r_m$ is an auxiliary (slack) vector. Equation (15) can be easily and efficiently solved using an available linear programing package. A potential problem with this method is the selection of α. For each bus m, the value of α should be determined based on the sum of the conductances and susceptances of the lines connected to that bus. This would require a prior knowledge about the power grid, which is not always available.

To address the aforementioned problem, equation (15) is modified, and the sum of the conductances and susceptances connected to each bus is advantageously considered as an equality constraint in the linear programming, where the value of the sum is a variable. By using a search process described herein (e.g., with respect to FIG. 7), in which the linear programming equation (15) is solved for the values of the constraint, the correct value of the sum of the conductances and susceptances that gives the minimum among the solutions of equation (15) can be found to determine an accurate topology of the electrical power grid around the $m^{th}$ bus. This can be shown in equation (17) as:

$$\underset{y_m}{\text{minimize}} \quad u_m^T y_m \quad (17)$$

$$s.t. \quad \begin{aligned} S_m y_m &\leq f_m \\ d_m^T y_m &= -\lambda_m \end{aligned}$$

where, according to equation (18):

$$y_m = \begin{bmatrix} w_m^T & r_m^T \end{bmatrix}^T, u_m = [0_{1 \times 2N} \ 1_{1 \times 2M}]^T, d_m = [-g_m^T \ 0_{1 \times 2M}]^T \quad (18)$$

$$S_m = \begin{bmatrix} H_m & -I_{2M} \\ -H_m & -I_{2M} \\ -I_{2N} & 0_{2N \times 2M} \end{bmatrix}, f_m = \begin{bmatrix} b_m \\ -b_m \\ 0_{2N \times 1} \end{bmatrix}.$$

and $\lambda_m$ is the variable that represents the sum of the conductances and susceptances connected to bus m. To find an initial value for $\lambda_m$, a nonnegative least-squares solution of equation (7) is used. The method then iteratively searches for the supremum or optimum value of $\lambda_m$, which is then used to find $G_{*m}$ and $B_{*m}$.

Figure 5:
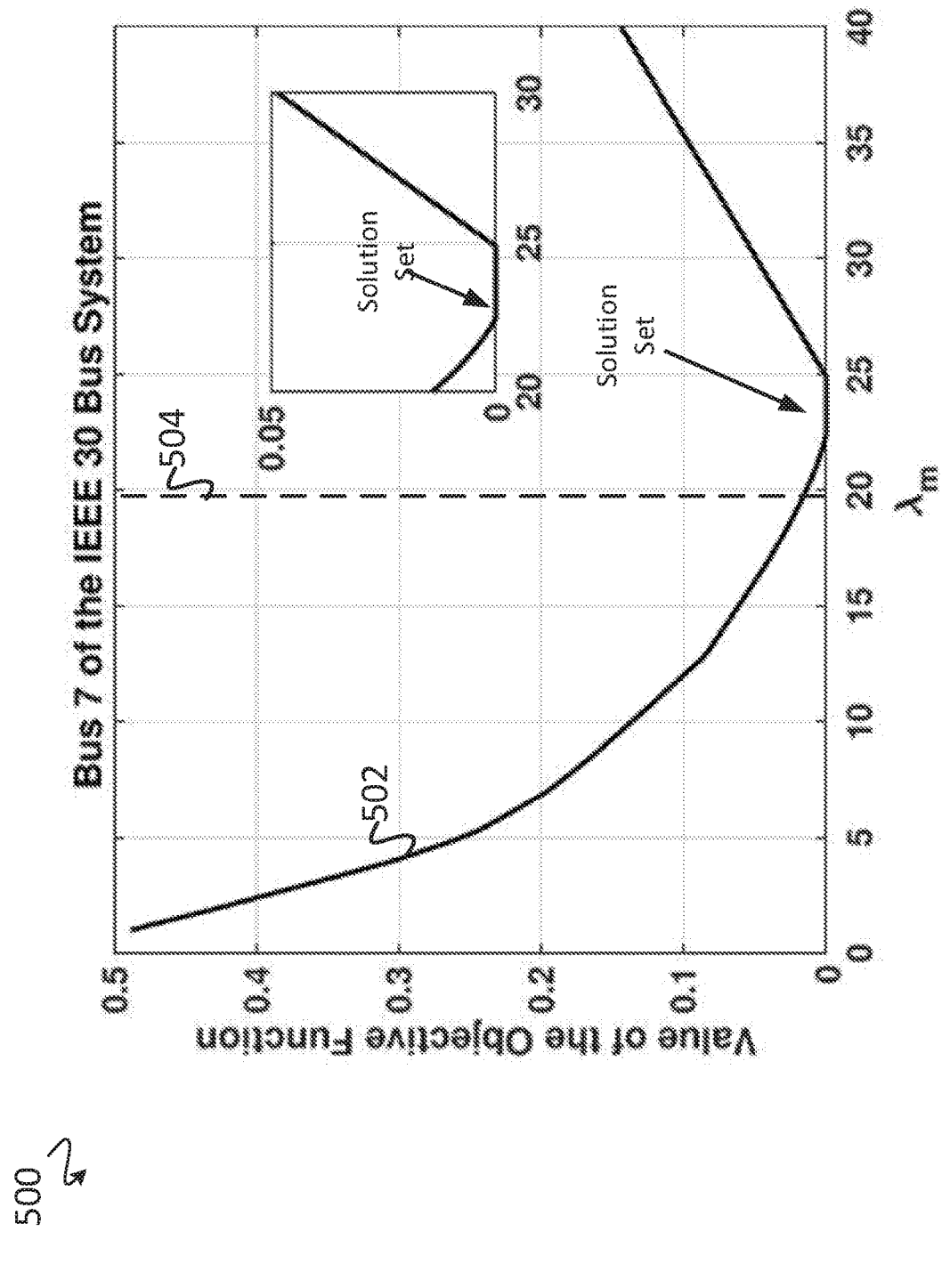
FIGS. 5 and 6 are simplified graphs illustrating topology determination of an electrical power grid, in accordance with some embodiments.

The objective function of equation (17) may be minimum for more than one value of $\lambda_m$. The set of $\lambda_m$ values in which the objective function is minimum is called the solution set of the optimization, as shown in FIG. 5 which provides an example graph 500 illustrating a portion the search process described herein. The supremum or maximum of this set is the final solution to the problem, which is called $\lambda^*_m$. The example graph 500 illustrates the change of the value of the objective function 502 of the solution to equation (17) for different values of $\lambda_m$ for a standard IEEE 30 bus system. The value of the objective function 502 is shown to be minimum or zero for a range of values of $\lambda_m$ between about 22 and 25. This is the solution set. A vertical dashed line 504 shows the least-squares solution to equation (7) that has been used as the initial point of the search algorithm (with adaptive step size) to find the supremum of this set, which is the solution that is identified as the breaking point where the graph starts to increase from the minimum value of the objective function (i.e., approximately $\lambda^*_m = 25$ in this case). Details of this search process are shown and described with respect to FIG. 7 and FIGS. 8A-D.

An important parameter in the search process is the step size of $\lambda_m$, which is designated as s. The value of the step size s makes a trade-off between the speed and accuracy of the algorithm. A smaller step size s makes the result more accurate, but it increases the number of iterations to get to the solution. On the other hand, a larger step size s speeds up the calculations by reducing the number of iterations but reduces the accuracy. Increasing the step size s too much may cause the search process not to converge to the solution, since $\lambda_m$ may bypass its optimum value. To stop the iteration, a minimum step size $s_{min}$ is used. Typical values of the step size s and the minimum step size $s_{min}$ are 0.1 and $10^{-6}$, respectively. The search process advantageously uses an initial value of s, but having surpassed the supremum, backtracks and uses a smaller step size to zero-in on the supremum.

Figure 6:
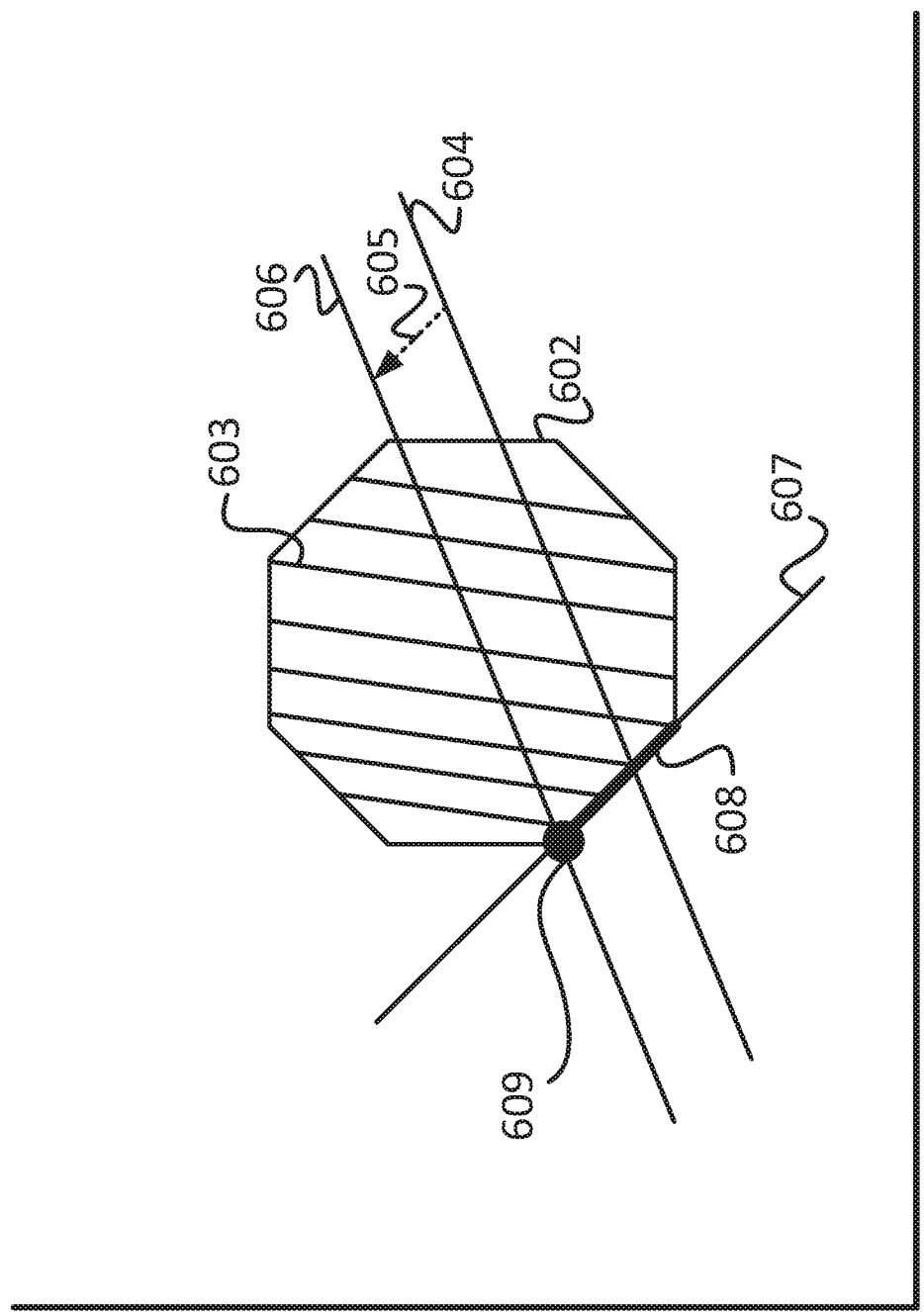

FIG. 6 provides a simplified graph 600 illustrating a solution space of equation (17). The constraint $S_m y_m \leq f_m$ 603 is within polytope 602. The constraint $d_m^T y_m = -\lambda_m$ is represented by hyperplane 604. Increasing the value of $\lambda_m$ will move the hyperplane 604 at the direction shown by the dashed line 605 until it reaches the position of hyperplane 606. The objective function $u_m^T y_m$ (of equation (17)) is represented by hyperplane 607. The solution set (i.e., as shown in FIG. 5) is shown as bolded line 608 where one of the sides of the polytope 602 coincides with the objective function represented by the hyperplane 607. The point 609 is the solution of the objective function of equation (17) where $\lambda_m$ is maximized (the hyperplane 604 has moved to the position of hyperplane 606) and the point 609 is in the solution set 608.

Another method that can be used, instead of the linear programming of equation (17), is a constrained nonnegative least squares method according to equation (19), which is the same as equation (14), except the p value is 2:

$$\underset{w_m}{\text{minimize}} \quad \|H_m w_m - b_m\|_2 \quad (19)$$

$$s.t. \quad \begin{aligned} g_m^T w_m &= \lambda_m \\ w_m &\geq 0 \end{aligned}$$

This method can include the equality constraint of equation (19) in the optimization problem as shown in equation (20):

$$\underset{\hat{w}_m}{\text{minimize}} \quad \|\hat{H}_m \hat{w}_m - \hat{b}_m\|_2 \quad (20)$$

$$s.t. \quad \hat{w}_m \geq 0$$

where, according to equation (21):

$$\hat{H}_m = \begin{bmatrix} -A_m C_m & 0_{2M \times 1} \\ g_m^T & -1 \end{bmatrix}, \hat{w}_m = [w_m^T \lambda_m]^T, \hat{b}_m = [b_m^T 0]^T \quad (21)$$

Equation (20) can be solved using a nonnegative least squares optimization to obtain both $w_m$ and $k_m$. However, this method may not be effective when the sparsity of $w_m$ is high. This method is more effective when some of the entries of G and B are known so that the sparsity of $w_m$ can be reduced. In the situations where the sparsity of $w_m$ is high, the method given in (17) should be used where the initial value of $\lambda_m$ can be obtained by (20).

Considering and Calculating Possible Connections

In some embodiments, the solution to equation (17) finds the topology of a noisy network even if it is entirely unknown. In reality, however, the network is usually not entirely unknown. Instead, it is almost always known which buses are definitely not connected to each other. If two buses are "definitely" not connected to each other, there is no likely circumstance in which they can become connected to each other. For example, two buses that are disconnected due to a state of a switch or a breaker are not said to be definitely not connected to each other. Similarly, two buses that are not connected to each other, and cannot likely be connected to each other by a configurable component such as a switch or breaker are considered to be definitely not connected to each other. In some embodiments, thus, connections between these buses can typically be removed from the calculations, because the corresponding reactances and conductances between unconnected buses are always zero. In other words, a zero value in the admittance matrix, which generally defines the topology, indicates that the two nodes or buses at that row-column of the matrix are not connected to each other in the power grid. Moreover, when the techniques disclosed herein begin identifying the topology of the $m^{th}$ bus, the technique determines the partial topology of the buses that are connected to the $m^{th}$ bus. Therefore, there exists situations where some of the entries of the matrices G and B are known. In real-world situations, these known entries are much greater in number than the unknown entries because there are far more definitely not-connected buses (zero impedance between them) and some known values calculated from identifying previous buses (the buses are identified sequentially). These known values will significantly reduce the size of the matrices and simplifies the numerical computation of the optimization problem (e.g., by reducing a number of variables used in the minimization of the objective function).

Assume that at the $m^{th}$ bus, only $N_m$ values of $G_{*m}$ and $B_{*m}$ are unknown, i.e., $N-N_m$ values are known. Let all unknown values of $x_m$ be collected in $\tilde{x}_m \in \mathbb{R}^{2N_m \times 1}$: then (7) changes to $$\tilde{A}_m{}^{37}\tilde{x}_m = \tilde{b}_m \qquad (22)$$

where $\tilde{A}_m \in \mathbb{R}^{2M \times N_m}$ is created by removing the columns of $A_m$ corresponding to the known entries of $x_m$, and $\tilde{x}_m$ contains the unknown values of $x_m$. Moreover, the vector $\tilde{b}_m$ is defined as $\tilde{b}_m = b_m - \hat{A}_m \hat{x}_m$, where $\hat{A}_m$ contains the columns of $A_m$ corresponding to the known entries if $x_m$ and $\hat{x}_m$ are the known values of $x_m$. By inserting the reduced dimension matrices $\tilde{A}_m$, $\tilde{b}_m$ and $\tilde{x}_m$ in (20) and (21) the unknown entries of matrices $G_{*m}$ and $B_{*m}$ can be found.

Special Issues

The following special cases may occur when solving equation (20) or equation (17) and generally need to be dealt with to have a converging search process.

In the system of equations (7) and (22), the matrices $A_m$ and $\tilde{A}_m$ are rank deficient for buses that have zero power injections (ZPIB), i.e., buses not connected to a power generator or load. This is because of the fact that the vector $b_m$ becomes zero, but equation (22) needs to have a non-trivial solution. This can be explained as a two degree redundancy in the Kirchhoff's voltage law (KVL) and Kirchhoff's current law (KCL) equations at the $m^{th}$ bus. This can also be explained as the fact that the admittances of the lines connected to the $m^{th}$ bus can be all scaled with the same factor with no change in the voltage phasor at the $m^{th}$ bus.

Equation (17) and equation (20) can be solved if one of the connecting lines is fully identified. This can be achieved by measuring the current of a line, or it can be obtained from the adjacent non-zero power injection buses (NZPIB), i.e., buses connected to a power generator or load. In the latter case, there is a possibility that the solution has a small sparsity. For example, if the conductance of a line is zero and the susceptance of that line is nonzero, then the zero solution cannot be removed from the calculations, because the zero conductance could be the status of a switch (off status), which cannot be ignored in the calculations. In such cases, the solution could have a large error at the entry where the value is supposed to be zero. The erroneous value could then be used in the identification of an adjacent bus, which will result in erroneous identification of the connected lines. Thus, errors propagate further in the identification of the entire network. To avoid this, it is possible to start the calculations with the ZPIB s that have fewer connection lines and then proceed with buses that have more connections. Alternatively, it is possible to start the calculations with the NZPIBs that have more connections, then proceed with NZPIBs that have fewer connections, and then proceed with the ZPIBs. This approach could avoid propagating the error in the identification of the system. Using equation (17) can address this issue, because having sparsity in the equations would not create any problem (albeit at the cost of significantly more computations). Nevertheless, the strategy of starting the analysis with the NZPIBs with more connection lines would be beneficial.

Additionally, in some special cases where the voltage magnitude of two connected buses are fixed (e.g., they are connected to constant-supply generators) and their phase difference is also fixed, matrices $A_m$ and $\tilde{A}_m$ are always rank deficient and equations (7) and (22) have infinite solutions. These situations are very rare in topology identification of a power grid (e.g., buses 8, 9, 10, 110 and 111 of the standard IEEE 118 Bus System). To solve the problem for these situations, more measurements are needed to independently identify the admittance of one or more lines connected to the bus, or the admittance of one or more of the connections needs to be known. If the latter is known, it can be added to the matrices B and G and be fed into the search process as explained herein.

Furthermore, due to the symmetry of the admittance matrix, the values of reactance and conductance of a line between bus m and bus n are seen the same from both buses. Therefore, the values calculated for bus m can be used as known values in the calculations for bus n as explained herein. However, if there is a phase shifting transformer connected between buses m and n, then the reactance and conductance of the line seen from bus m is different from those seen from bus n. To consider these cases, the location of the phase-shifting transformers needs to be known. Then in the calculations, the values calculated for one bus cannot be used as the known values for the other one.

Justification for Maximization of Sum of
Conductances and Susceptances

If the line admittances connected to node m are $Y_{im}$; i=1, 2, . . . N, where $Y_{mm}$ is the shunt connected from node m to ground, then the complex power of the network around node m can be found with equation (24) as:

$$S_m = Y_{mm}^* |V_m|^2 + \sum_{\substack{i=1 \\ i \neq m}}^{N} Y_{mi}^* |V_m - V_i|^2. \qquad (24)$$

Since $V_i$ and $V_m$ are voltage phasors, i.e., $V_i = |V_i|e^{j\theta_i}$ and $V_m = |V_m|e^{j\theta_m}$, and $Y_{mi} = g_{mi} + jb_{mi}$, equation (24) can be simplified to equation (25):

$$S_m = |V_m|^2 (g_{mm} - jb_{mm}) + \sum_{\substack{i=1 \\ i \neq m}}^{N} \gamma_{mi}(g_{mi} - jb_{mi}), \qquad (25)$$

$$\gamma_{mi} = |V_m|^2 + |V_i|^2 - 2|V_m||V_i|\cos(\theta_{mi}), \quad \theta_{mi} = \theta_m - \theta_i.$$

Active power dissipated in the admittances can be extracted from equation (25) as equation (26):

$$P_m = |V_m|^2 g_{mm} + \sum_{\substack{i=1 \\ i \neq m}}^{N} \gamma_{mi} g_{mi}. \qquad (26)$$

Moreover, reactive power consumed in the load can be shown as equation (27):

$$Q_m = -|V_m|^2 b_{mm} - \sum_{\substack{i=1 \\ i \neq m}}^{N} \gamma_{mi} b_{mi}. \qquad (27)$$

According to the Second Law of Thermodynamics, in a closed irreversible system the Entropy Production Rate (EPR) is maximum. The EPR is defined in equation (28) as the change in energy consumption rate:

$$\frac{d\Sigma}{dt} = \frac{1}{T}\frac{dE}{dt}, \qquad (28)$$

where $$\frac{d\Sigma}{dt}$$

is the EPR, dE/dt is me energy consumption rate, and T is the temperature. Therefore, maximization of the EPR in the resistive part of the system (26), which is an irreversible system, is equivalent to the maximization of the energy dissipation rate as heat or the active power. On the other hand, the non-resistive part of the system involving inductors and capacitors (27) is reversible and the energy exits and then enters in each half cycle. Therefore, the entropy increases in the first half cycle and then decreases in the second half cycle, so the total entropy is zero at each cycle for the non-resistive part of the system. However, the EPR in each cycle should be maximized, which is equivalent to maximization of $|Q_m|$. Therefore, the overall power that exits the system in a half cycle $P_m+|Q_m|$ (29) should be maximized.

$$P_m + |Q_m| = |V_m|^2(g_{mm} + b_{mm}) + \sum_{\substack{i=1 \\ i \neq m}}^{N} \gamma_{mi}(g_{mi} + b_{mi}). \qquad (29)$$

This advantageously leads to the some of the constraints that enable the effectiveness of the present invention for generating G and B for identifying the topology.

An arbitrary variable σ is defined so that $0<\sigma<|V_m|^2$ and $0<\sigma<\gamma_{mi}$ for i=1, 2, . . . , m. By substituting $|V_m|^2$ and $\gamma_{mi}$ with σ, the lower bound of $P_m+|Q_m|$ can be found according to (30):

$$(P_m + |Q_m|)_l = \sigma \sum_{i=1}^{N}(g_{mi} + b_{mi}) < P_m|Q_m|. \qquad (30)$$

Maximizing $\Sigma_{i=1}^{N}(g_{mi}+b_{mi})$ will maximize the lower bound $(Pm+|Q_m|)_l$, which will guarantee maximizing $P_m+|Q_m|$. Since $$G_{mm} - B_{mm} = \sum_{i=1}^{N}(g_{mi} + b_{mi})$$

(see equations (6) and (11)); therefore, $G_{mm}-B_{mm}$ should be maximized. It should be noted that $B_{mm}$ is negative, hence $G_{mm}-B_{mm}$ is always positive. This leads to the objective function of equation (12) and suggests that the present invention is appropriate for all bus systems or all electrical power systems.

Search Process

Figure 7:
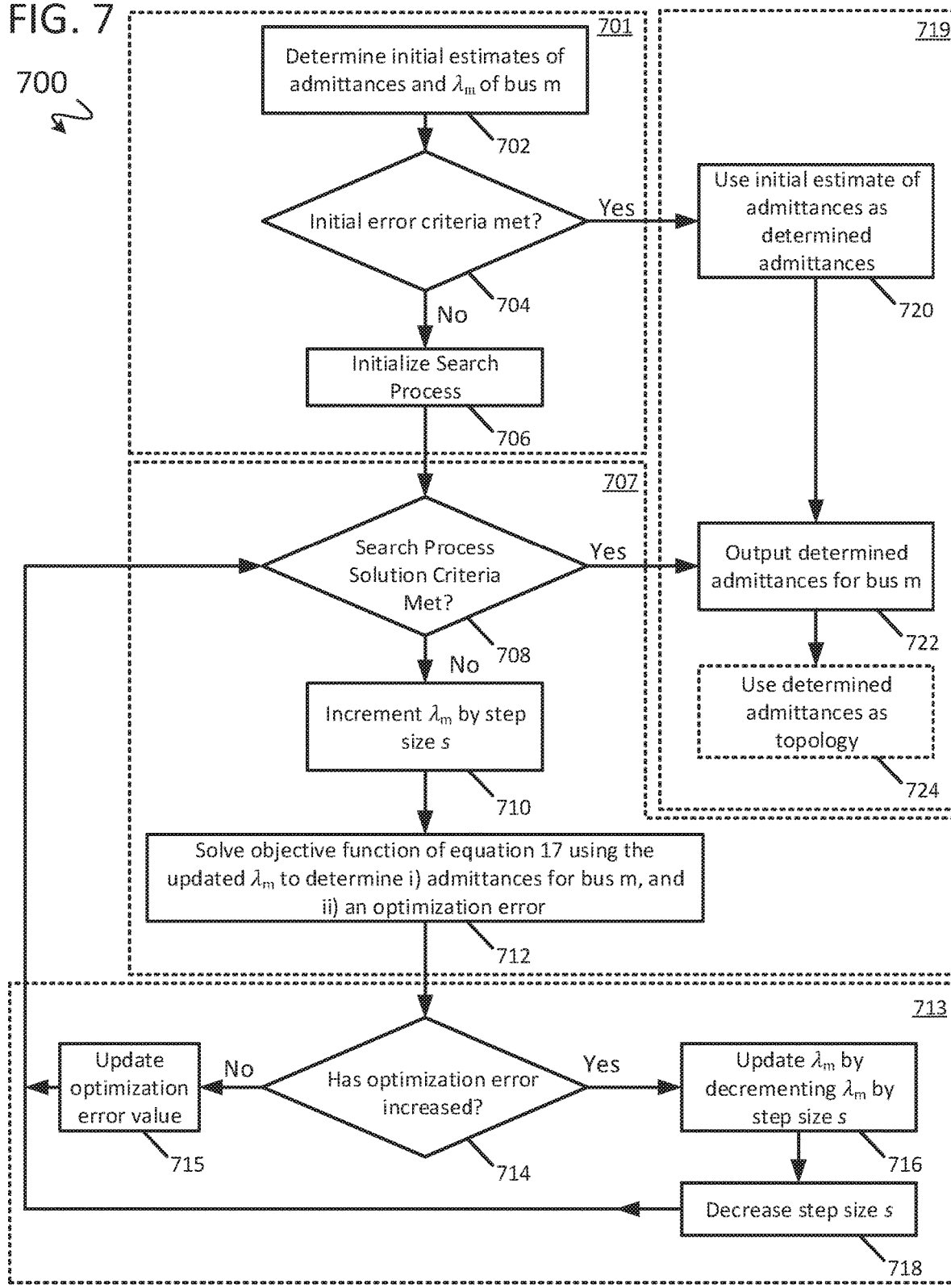
FIG. 7 is a simplified portion of an example process for determining the topology of an electrical power grid, in accordance with some embodiments.

FIG. 7 includes simplified portion of an example process 700 for determining a topology of an electrical power system, in accordance with some embodiments. The search process 700 is operable to determine the $m^{th}$ row and column of matrices G and B in accordance with the description provided above. This process has been confirmed in simulations of standard IEEE 14, 30, 57, 118 and 300 bus systems and is, thus, expected to be applicable to any electrical power system. The outputs of the search process 700 include the admittances that are connected to the bus m, i.e., the $m^{th}$ row and column of the conductance matrix G and the susceptance matrix B, which is then repeated for each bus.

Details of each of the steps of the process 700, grouped as blocks 701, 707, 713, and 719, are shown and discussed with reference to FIGS. 8A-D, respectively. In some embodiments, all or a portion of the steps of the process 700 are performed at the energy management system 408 shown in FIG. 4. The particular steps, order of steps, and combination of steps are shown for illustrative and explanatory purposes only. Other embodiments can implement different steps, orders of steps, and combinations of steps to achieve similar functions or results. The process 700 may be performed using power data measurements produced by physical instruments (e.g., PMUs), distributed throughout the electrical power grid, that automatically produce power data measurements at a high data rate of at least 30 samples per second. The process 700 rapidly determines a topology of the electrical power system using the power data measurements. In some embodiments, the determined topology is ultimately used to adjust a physical state of the electrical power system, such as a generator output level. The process 700 is performed using one or more processors, servers, application-specific integrated circuits (ASICs), digital signal processors (DSPs), and/or field-programmable gate arrays (FPGAs) that are operable to rapidly solve optimization equations (e.g., as shown in equation (17)) given a high-rate of incoming data. In some embodiments, the process 700 is performed for each bus m (i.e., the $m^{th}$ bus) of an N bus electrical power system to determine the topology of the N bus electrical power grid.

In some embodiments, the process 700 further includes determining a number of connections associated with each non-zero power injection bus of the N bus electrical power system, and/or a number of connections associated with each zero power injection bus of the N bus electrical power system. In some embodiments, the process 700 is performed for each bus m of the N bus electrical power system in order of most connections to other buses, beginning with the buses of the N bus electrical power system that are non-zero power injection buses. That is, the process 700 is performed first for the non-zero power injection bus of the N bus electrical power grid having the first most number of connections to other buses, and then is next performed for the non-zero power injection bus of the N bus electrical power grid having the second most number of connections to other buses, and so on, until the process 700 has been performed for the non-zero power injection bus of the N bus electrical power grid having the least number of connections.

In some embodiments, the process 700 is first performed for all buses of the N bus electrical power grid that are non-zero power injection buses, and then subsequently performed for all buses of the N bus power grid that are zero power injection buses. When processing the zero power injection buses of the N bus electrical power grid, in some embodiments, the process 700 is performed first for the zero power injection bus of the N bus electrical power grid having the first fewest number of connections to other buses, and then is next performed for the zero power injection bus of the N bus electrical power grid having the second fewest number of connections to other buses, and so on, until the process 700 has been performed for the zero power injection bus of the N bus electrical power grid having the most number of connections.

At step 702, an initial estimate of the admittances and sum of the conductances and susceptances $\lambda_m$ of bus m of an N bus electrical power grid are determined. At step 704, it is determined if the initial estimate of the admittances of bus m meets initial error criteria (e.g., is the initial estimate determined to be within a desired error threshold). If it is determined that the initial estimate of the admittances of bus m do not meet the initial error criteria, flow of the process 700 continues to step 706. At 706, variables and thresholds used by a search process of the process 700 are initialized. At step 708, it is determined if solution criteria of the search process have been met. If it is determined at step 708 that solution criteria of the search process have not yet been met, flow continues to step 710. At step 710, the estimated sum of conductances and susceptances $\lambda_m$ is incremented by a step size s. At step 712, the objective function shown in equation (17) is solved using the estimated sum of conductances and susceptances $\lambda_m$ as a linear constraint (as discussed with reference to equation (12)). In some embodiments, a second linear constraint is also used, the second linear constraint being the sign constraint discussed with reference to equation (9), The solution of the objective function shown in equation (17) produces an estimate of the admittances for bus m and an updated optimization error value.

At step 714, if it is determined that the updated optimization error value generated at step 712 has not increased relative to a prior optimization error value generated at step 712, flow continues to step 715, where a value storing the optimization error is updated to indicate a lowest optimization error achieved by the process 700 for the bus m. However, at step 714, if is determined if the updated optimization error value generated at step 712 has increased relative to the prior optimization error value generated at step 712, flow continues to step 716. An increase in the optimization error value generated at step 712 may indicate that the estimated sum of conductances and susceptances represented by $\lambda_m$ has overstepped the actual sum of conductances and susceptances for bus m. Thus, at step 716, $\lambda_m$ is decremented by the step size s. Then, at step 718, the step sizes is decreased. As such, the estimated sum of conductances and susceptances represented by $\lambda_m$ is subsequently incremented with higher resolution as compared to the previous step size s. Flow returns from step 718 back to step 708, where it is determined if the search process solution criteria has been met.

If it is determined at step 708 that the search process solution criteria have been met, flow of the process 700 continues to step 722 where the determined admittances for bus m are output from the search process. At step 724, the determined admittances for bus m are used as part of the topology for the N bus electrical power grid After step 724, the process 700 may be next performed for bus m+1 of the N bus electrical power grid. In some embodiments, the process 700 is performed for each bus of the N bus electrical power grid (i.e., flow may continue back to step 702 for bus m+1, then bus m+2, and so on). In other embodiments, known bus connections of the N bus electrical power grid may be used as an input (e.g., a linear equality constraint) to the search process of the process 700.

In some instances, the initial estimate of the admittances of bus m performed at step 702 may meet the initial criteria tested at step 704. In such instances, flow continues from step 704 to step 720, where the initial estimate of the admittances of bus m are used as the determined admittances for bus m. Flow then continues from step 720 to step 722, where the determined admittances for bus m are output from the search process.

Figure 8A:
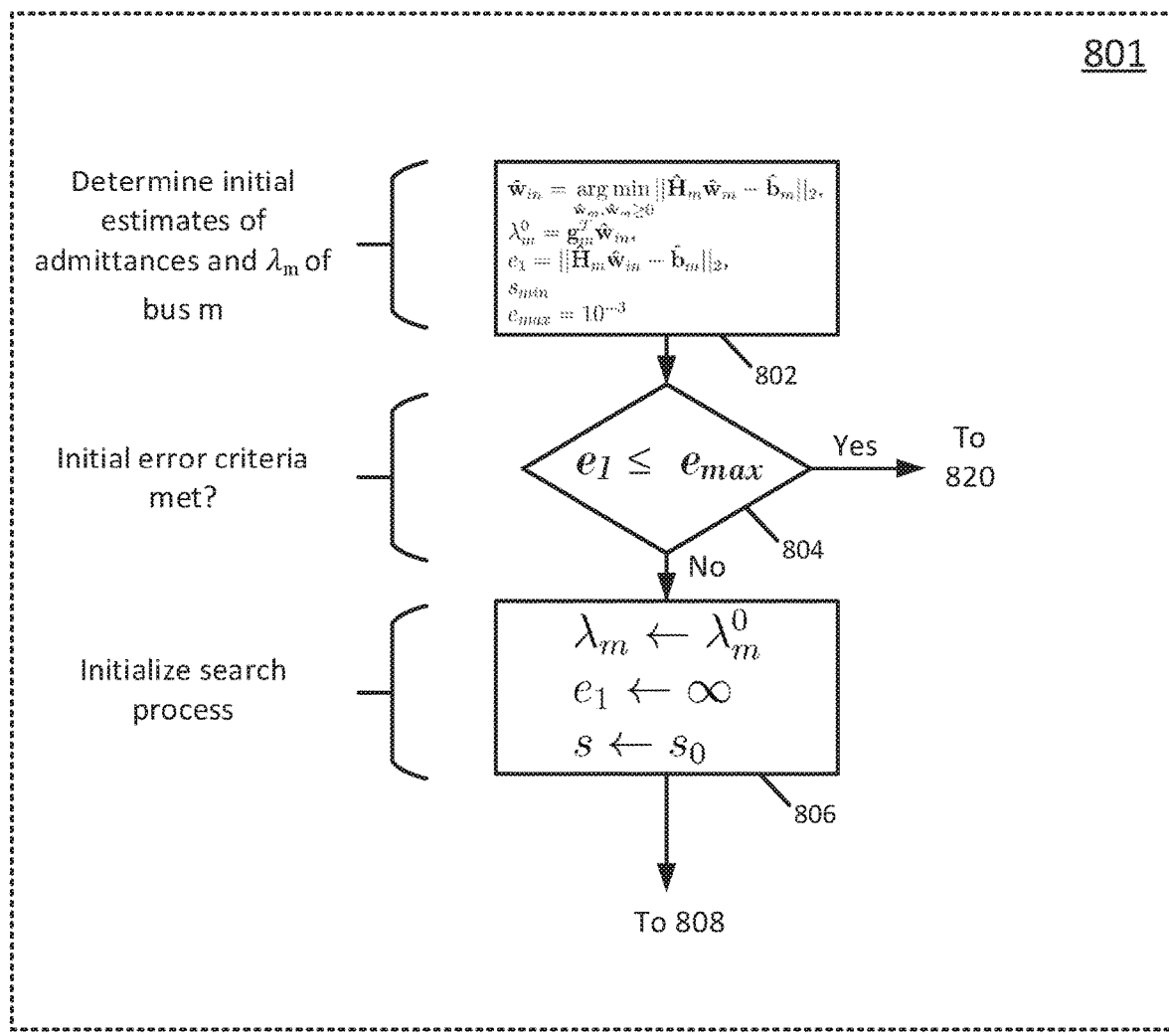
FIGS. 8A-8D show details of the simplified portion of the example process shown in FIG. 7, in accordance with some embodiments.

FIG. 8A provides an example implementation 801 of block 701 of the process 700 shown in FIG. 7, in accordance with some embodiments. That is, step 802 is an example implementation of step 702, step 804 is an example implementation of step 704, and step 806 is an example implementation of step 706. Variable names, except where noted, are described above.

At step 802, an initial estimate of the admittances and an estimated sum $\lambda_m$ of the conductances and susceptances of bus m are determined. In the example shown, an initial estimate of the admittances $\hat{w}_{in}$ of bus m (i.e., the $m^{th}$ bus) of an N bus electrical power grid is determined as a constrained nonnegative least-squares solution of (20), given known power data measurements. In the example shown, the power data measurements include power measurements represented by $\hat{b}_m$ and voltage phasor measurements represented by $\hat{H}_m$. An initial estimate of the sum of the conductances and susceptances $\lambda^0_m$ of bus m is determined using the initial estimate of the admittances $\hat{w}_{in}$. An error value $e_1$ of the search process is determined using the initial estimate of the admittances $\hat{w}_{in}$, the known power measurements represented by $\hat{b}_m$ and the known voltage phasor measurements represented by $\hat{H}_m$. A minimum step size $s_{min}$ allowed (e.g., $10^{-6}$), and a maximum acceptable error $e_{max}$ (e.g., $10^{-3}$) are defined. These values may change for different grids.

At step 804, it is determined if error criteria are met. If the error criteria are met, flow continues to step 820, shown in FIG. 8D. If it is determined that the error criteria are not met, flow continues to step 806. In the example shown, if the error value $e_1$ is not less than or equal to the maximum acceptable error $e_{min}$, the error criteria have not been met. In some embodiments, the condition at step 804 is removed and the process flows from step 802 to step 806 unconditionally. This will increase the numerical computation but will avoid selecting an arbitrary value for the maximum acceptable error $e_{max}$. Moreover, it can avoid large errors in situations where the sparsity of the solution is not small.

At step 806, a search process to determine the admittances for bus m is initialized. In the example shown, the estimated sum of conductances and susceptances $\lambda_m$ of bus m is initialized to the initial value $\lambda^0_m$. The initial error value $e_1$ is re-initialized to infinity, and an initial step size s is set to an initial step size so (e.g., 0.1) that is greater than $s_{min}$. Flow then continues to step 808, shown in FIG. 8B.

Figure 8B:
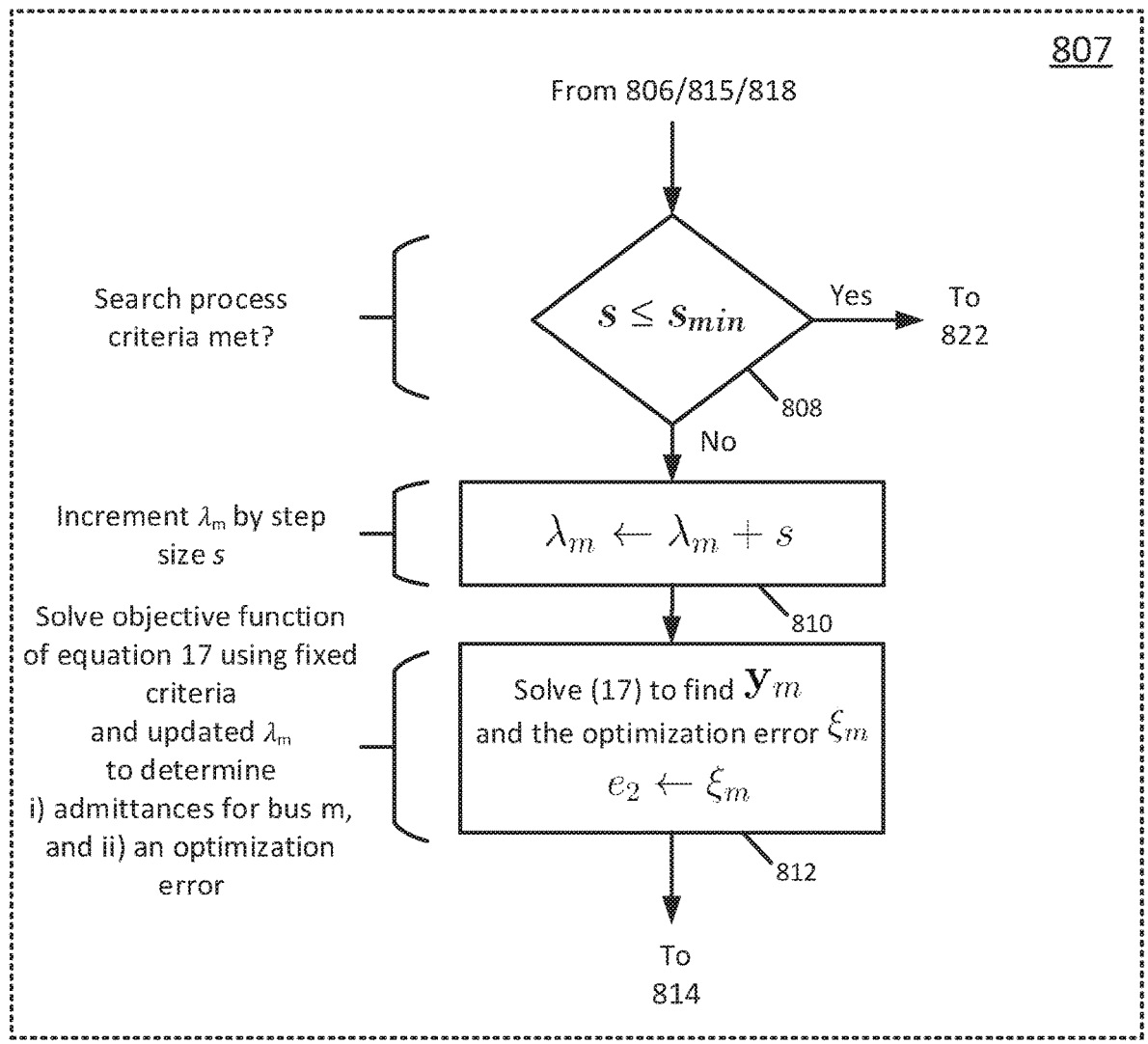

FIG. 8B provides an example implementation 807 of block 707 of the process 700 shown in FIG. 7, in accordance with some embodiments. Step 808 is an example implementation of step 708, step 810 is an example implementation of step 710, and step 812 is an example implementation of step 712. Variable names, except where noted, are described above. At step 808, it is determined if search process criteria have been met. If it is determined at step 808 that the search process criteria have been met, flow continues to step 822, shown in FIG. 8D. If it is determined at step 808 that search criteria has not yet been met, flow continues to step 810. In the example shown, the search criteria at step 808 includes determining whether the current step size s for the estimated sum $\lambda_m$ of the conductances and susceptances for bus m is less than or equal to the minimum step size $s_{min}$. If the current step size s is less than or equal to the minimum step size $s_{min}$, it may indicate that a solution for the admittances of the bus m have been determined within a desired accuracy.

At step 810, if it was determined at step 808 that the search criteria have not been met, the estimated sum $\lambda_m$ of the conductances and susceptances of the bus m is incremented by the step size s. At step 812, the objective function shown at equation (17) is solved (i.e., minimized) to determine the estimated admittances for bus m and an associated optimization error value $\xi_m$. As previously discussed, the optimization function is solved, in some embodiments, by at least using a maximization of the estimated sum of conductances and admittances $\lambda_m$ as a first linear constraint, and a sign constraint discussed with reference to equation (9) as a second linear constraint. Thus, equation (17) is solved at step 812 using the updated estimated sum $\lambda_m$ of the conductances and susceptances of the bus m that was incremented by the step size s at step 810. In the example shown, the optimization error $\xi_m$ produced by solving the objective function is stored as an updated error value $e_2$. Flow then continues to step 814, shown in FIG. 8C.

Figure 8C:
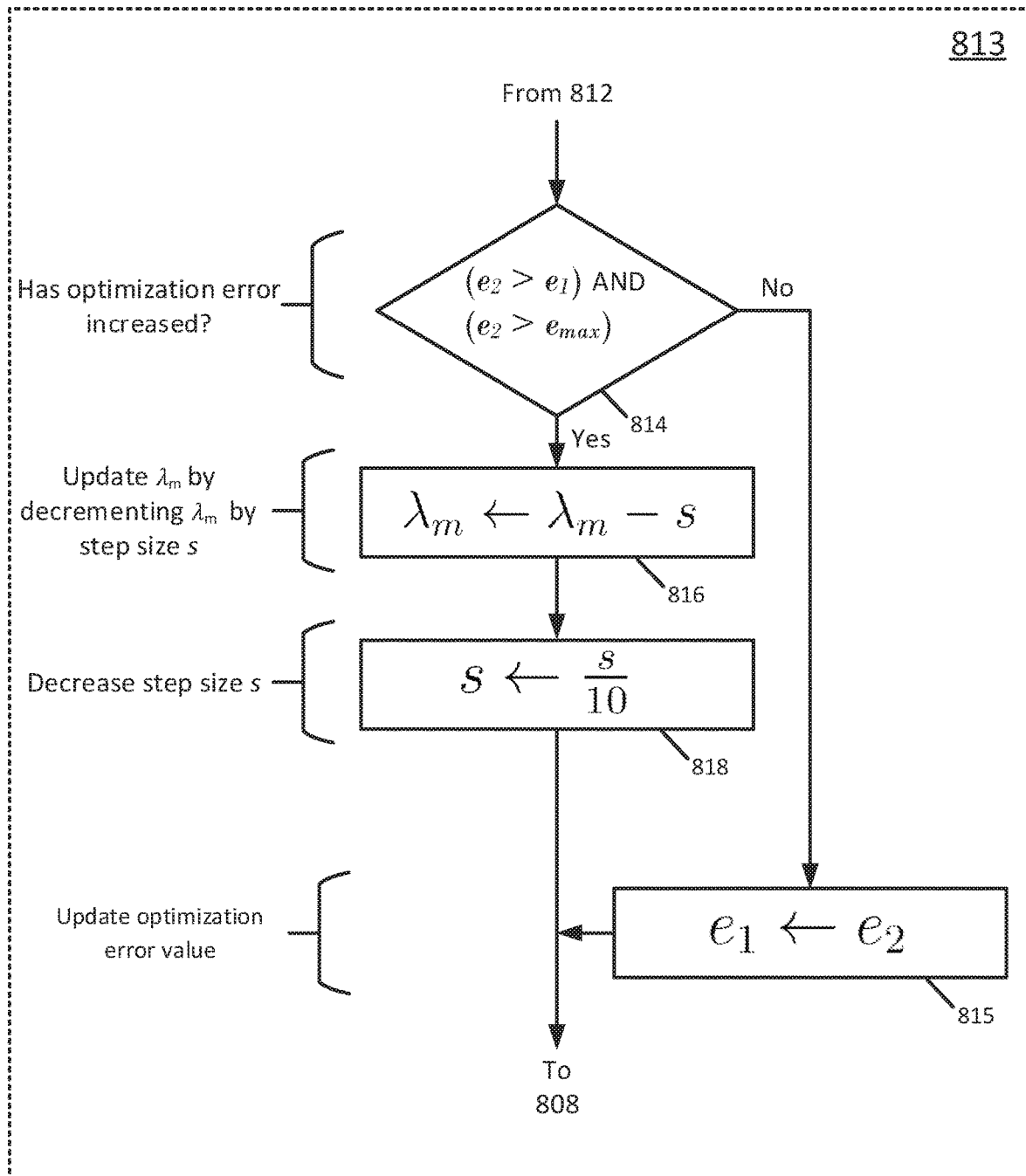

FIG. 8C provides an example implementation 813 of block 713 of the process 700 shown in FIG. 7, in accordance with some embodiments. Step 814 is an example implementation of step 714, step 815 is an example implementation of step 715, step 816 is an example implementation of step 716, and step 818 is an example implementation of step 718. Variable names, except where noted, are described above.

At step 814, it is determined if optimization error has increased as compared to a prior iteration of step 812, shown in FIG. 8B. If it is determined at step 814 that the optimization error has increased, flow continues to step 816. If it is determined at step 814 that the optimization error has not increased, flow continues to step 815. In the example shown, determining if the optimization error has increased at step 814 includes a comparison of the current lowest optimization error value, stored as error value $e_1$, to the most recently determined optimization error value, stored as error value $e_2$. Additionally, it is determined if the most recently determined optimization error value, stored as error value $e_2$, is greater than a maximum allowable optimization error value, $e_{max}$.

At step 815, the optimization error value is updated. In the example shown, if it was determined at step 814 that the most recently determined optimization error value $e_2$ is the same as, or lower than, the current lowest optimization error value $e_1$, the current lowest optimization error value $e_1$ is set to the value of $e_2$. Flow then continues back to step 808 of FIG. 8B.

If it was determined at step 814 that the optimization error has increased, at step 816, the estimated sum $\lambda_m$ of the conductances and susceptances of the bus m is updated by decrementing $\lambda_m$ by the step size s. An increase in optimization error may indicate that the incremented (at step 810) estimate of the sum $\lambda_m$ of the conductances and susceptances of the bus m has overstepped the actual sum of the conductances and susceptances of the bus m. Thus, at step 816, the estimate of the sum $\lambda_m$ of the conductances and susceptances of the bus m is decremented by that same step size s. Then, at step 818, the step size s is reduced, thereby enabling $\lambda_m$ to be incremented using a finer resolution in subsequent iterations of the process 700 for bus m. In the example shown, the step size s is reduced by a tenth. In other embodiments, the step size s is reduced by a different value or ratio, which may be greater or less than a tenth of the previous step size s. After step 818, flow continues back to step 808 of FIG. 8B.

Figure 8D:
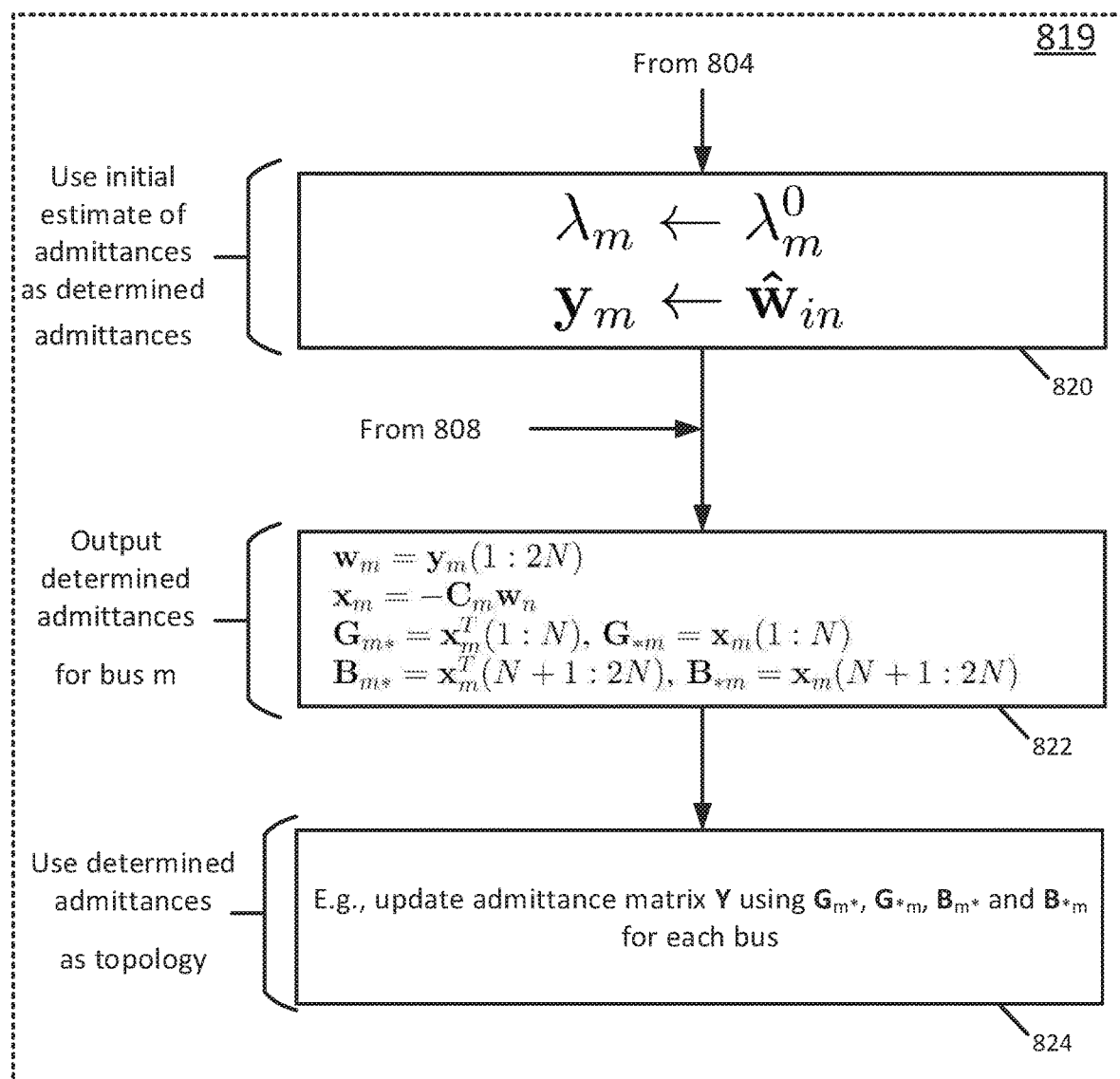

FIG. 8D provides an example implementation 819 of block 719 of the process 700 shown in FIG. 7, in accordance with some embodiments. That is, step 820 is an example implementation of step 720, step 822 is an example implementation of step 722, and step 824 is an example implementation of step 724. Variable names, except where noted, are described above.

At step 820, if it had been determined at step 804 that the initial error criteria was met based on the initial estimates of the admittances of bus m determined at step 802, the initial estimates of the admittances of bus m are used as the determined admittances of bus m. In the example shown, the estimated sum $\lambda_{in}$ of the conductance is set to the initial value $\lambda^0_m$ determined at step 804. Similarly, $\hat{w}_{in}$ is stored at variable $y_m$. Flow then continues to step 822.

At step 822, after step 820, or upon determining at step 808 that the search process criteria had been met, determined admittances $G_{m*}$, $G_{*m}$, $B_{m*}$, and $B_{*m}$ for the bus m are output from the process 700. At step 824, the determined admittances for the bus m from step 822 are used as a portion (i.e., for the $m^{th}$ bus) of the topology of the N bus electrical power grid. In the example shown, an N×N admittance matrix Y of the N bus electrical power grid is updated using $G_{m*}$, $G_{*m}$, $B_{m*}$, and $B_{*m}$ for the $m^{th}$ row and $m^{th}$ column of an admittance matrix Y. The process 700 is then continued to determine the admittances for the bus m+1 of the N bus electrical power grid, and at step 824, the admittance matrix Y is once again updated, now using $G_{m+1*}$, $G_{*m+1}$, $B_{m+1*}$, and $B_{*m+1}$ for row m+1 and column m+1 of the admittance matrix Y, and so on, for each bus of the N bus electrical power grid.

For each iteration of the process 700, a number of variables used for minimizing the objective function for a bus $m_n$ of the N bus electrical power grid may be advantageously reduced by using the previously determined admittances of the bus $m_{n-1}$. Thus, computation time and/or numerical complexity for each iteration of the process 700 is advantageously reduced as compared to a subsequent iteration of the process 700.

Upon determining the topology of the N bus electrical power grid, the topology may be, as described above, used to monitor and control numerous aspects of the electrical power grid. As described above, real-time determination of the topology of the electrical power grid can be advantageously used to provide rapid contingency analysis, line outage detection, detection and deterrence of cyber attacks, and fault determination in the electrical power grid. Such rapid determination of faults in the electrical power grid may advantageously mitigate the risk of wild fires.

Noisy Data

In reality, the measurements provided by the PMUs generally contain some level of error. It can be assumed that the errors have Gaussian distributions. In a worst case scenario, the variances of the errors are the maximum errors allowed in a PMU device. It can generally be assumed that the measurement errors of the voltage and current magnitudes are 0.2%, and the measurement error of the phase is 0.25°. This will amount to a measurement error of active and reactive power to be less than $4 \times 10^{-3}\%$ (the error is actually smaller due to the sine and cosine terms). It can further be assumed that the error does not change at consecutive samples, because the speed of sampling is very high and the noise (measurement error) generally does not change that fast.

Figure 9:
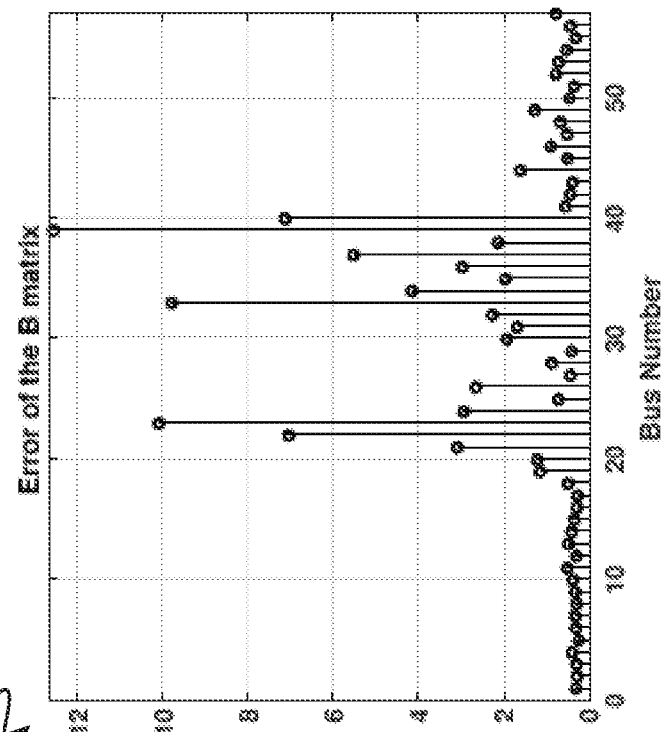
FIG. 9 shows graphs of example simulation results indicating a level of error in determining the topology of an electrical power grid, in accordance with some embodiments.
Figure 9:
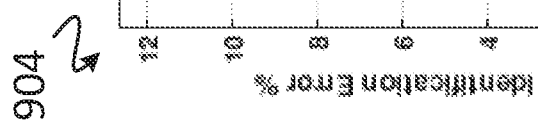
Figure 9:
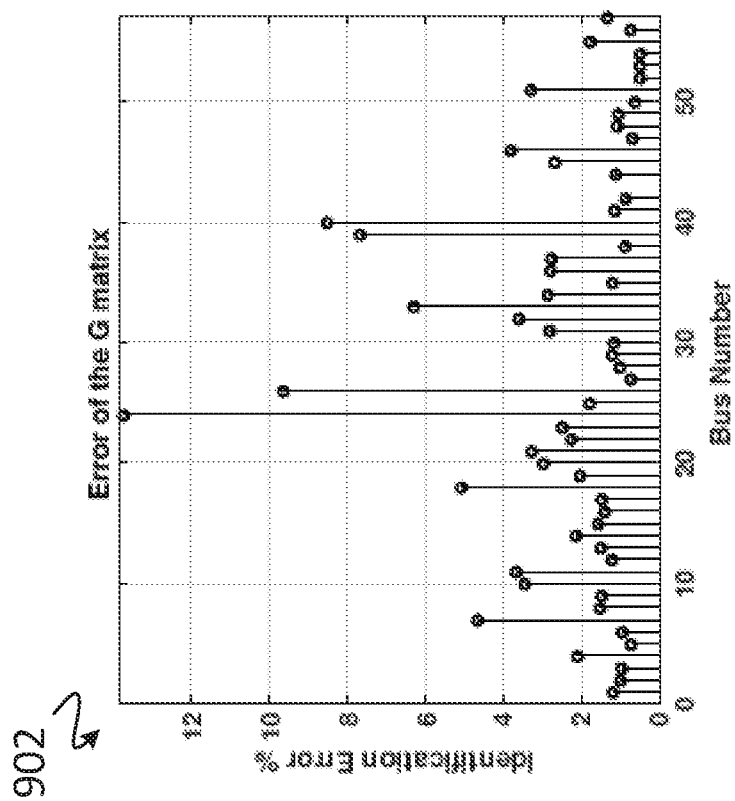

To study the effect of noise, the topology of the standard IEEE 57 Bus system has been identified as an example worst case scenario explained above. The total absolute error of the conductances and susceptances of the lines connected to the $m^{th}$ bus is calculated by the formula of equation (31):

$$\eta_m = \frac{\sum_{i=1}^{N_m} |\tilde{z}_m(i) - z_m(i)|}{\sum_{i=1}^{N_m} |z_m(i)|} \quad (31)$$

where $\tilde{z}_m$ is the solution to equation (17) or equation (20), $z_m$ is the known topology values (susceptance or conductance) and $\eta_m$ is the error. FIG. 9 shows the error of each bus in the IEEE 57 Bus system under the worst-case noise condition explained above when equation (17) is used.

FIG. 9 shows the conductance error of the connecting lines in the error bars at 902 and the susceptance error of the connecting lines in the error bars at 904 for extreme, or maximum, noise situations. The error bars of FIG. 9 are the ensemble average of the errors for the aforementioned Gaussian white noises over 100 realizations of the noise. The maximum error in this simulation was about 15% for one of the buses, which is generally considered acceptable. However, most of the errors were only about 1% or less. The buses that exhibit greater error values are typically the zero power injection buses mentioned above. Additionally, in some embodiments, the B matrix of 904 is more important than the G matrix of 902 for identifying the topology, as suggested by the lower errors for most of the buses in the B matrix 904 as compared to the G matrix of 902 in FIG. 9. In general, the overall susceptance error (error bars at 904) is smaller than the conductance error (error bars at 902). Thus, since the B matrix is more indicative of the topology of transmission systems, the method in equation (17) is generally very reliable. In general, the buses that have more connected lines can be identified with higher accuracy than the ones connected to fewer lines.

FIG. 10 includes example pseudocode 1000 for an example simplified software implementation of the process 700, in accordance with some embodiments. Details of the steps illustrated by the example pseudocode 1000 are described above with reference to FIGS. 8A-D.

It has been shown that the technique described herein is a very effective and accurate method for both topology identification and state estimation of transmission grids. Additionally, the present technique can easily replace the current state estimation algorithms where a linearized model of the power balance equations is used. Deployment of the present technique can greatly enhance the reliability, resilience and security of power transmission grids and can provide accurate monitoring and disaster prevention, including an efficient and reliable cyber-attack defense.

The present invention can provide utility companies with accurate real-time topology of the entire electric transmission power grid. The real-time topology of the power grid can enable the utility companies to know the state and characteristics of the devices and components in the power grid, such as the status of switches and transformer taps, the impedances of transmission lines, etc. Knowing the topology of the power grid can provide crucial information that can be used to identify potential failures in grid components, detect faulty devices that require attention, and show the power transfer pattern that can be used to divert power from one section of the grid to other sections, among other uses and benefits. This technique enables rapid detection of a failure in a portion of the power grid, e.g., disconnection of a high-voltage transmission line. This ability can enable the grid authorities to avoid power shutdown due to faulty situations, natural disasters such as wildfires, or other blockage situations (pets, plants, etc.) automatically in a self-healing manner or manually by immediately dispatching a team to take care of the problem.

Since the technique, shown at the high-level process 700 in FIG. 7, provides real-time topology information for the electrical power grid, it can also be used to identify faulty devices before they fail. This is important information that can be utilized to maintain the health of the entire grid and avoid blackouts that may otherwise have to be put in place during high winds to avoid wildfires.

Knowing the real-time topology of the electrical power grid can also be a benefit in averting cyber-attacks, which mainly attempt to feed incorrect information about the topology of the grid to fool the operators and cause overloads of the generators, which could lead to massive blackouts. The present invention is much more effective than the existing network resilience protocols, since the present invention provides real-time updates to the topology, so that any incorrect information inserted by a cyber-attack is quickly corrected.

Grid topology identification is also a key component in state estimation, which leads to accurate estimate of states of the power grid. The state of the electrical power grid is used to manage the distribution of the load among the generators and monitor the transient regime in the power grid.

The present invention can also be connected to GPS and on-line weather databases for better assessing the grid status in situations where extreme weather conditions can affect the operation of the grid, so that unnecessary shutdowns can be avoided.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments.

For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   i) receiving power data measurements at nodes of an electrical power grid, the electrical power grid having a plurality of buses;
   ii) for a first bus of the electrical power grid, repeatedly minimizing an objective function using the received power data measurements to determine estimated admittances between the first bus and other buses of the plurality of buses, the minimization of the objective function being linearly constrained by a repeatedly estimated sum of conductances and susceptances connected to the first bus;
   iii) determining a minimum value of the objective function that corresponds to a maximum value of the estimated sum of conductances and susceptances for the first bus; and
   iv) determining a portion of a topology of the electrical power grid associated with the first bus based on the estimated admittances that correspond to the minimum value of the objective function and to the maximum value of the estimated sum of conductances and susceptances for the first bus; and
   v) repeating steps i through iv for each bus of the electrical power grid to determine the topology of the electrical power grid;
   wherein:
   the first bus is a non-zero power injection bus; and
   steps i through iv are repeated for each bus of the plurality of buses that is a non-zero power injection bus before steps i through iv are repeated for each bus of the plurality of buses that is a zero power injection bus.

2. The method of claim 1, wherein:
   the minimization of the objective function is further linearly constrained by a fixed sign relationship of the estimated admittances associated with the first bus.

3. The method of claim 1, further comprising:
   determining, using the determined topology of the electrical power grid, that a fault has occurred within the electrical power grid.

4. The method of claim 1, wherein:
   the estimated admittances determined for the first bus of the plurality of buses are used to reduce a number of variables of the minimization of the objective function for determining estimated admittances for a second bus of the plurality of buses.

5. The method of claim 1, further comprising:
   before steps i through iv are repeated for each bus of the plurality of buses that is a non-zero power injection bus:
   determining which non-zero power injection bus has a first-most number of connections to other buses of the plurality of buses;
   determining which non-zero power injection bus has a second-most number of connections to other buses of the plurality of buses; and
   repeating the steps i through iv for the non-zero power injection bus that has the first-most number of connections before repeating the steps i through iv for the non-zero power injection bus that has the second-most number of connections.

6. The method of claim 1, further comprising:
   before steps i through iv are repeated for each bus of the plurality of buses that is a zero power injection bus:
   determining which zero power injection bus has a first-fewest number of connections to other buses of the plurality of buses;
   determining which zero power injection bus has a second-fewest number of connections to other buses of the plurality of buses; and
   repeating the steps i through iv for the zero power injection bus that has the first-fewest number of connections before repeating the steps i through iv for the zero power injection bus that has the second-fewest number of connections.

7. The method of claim 1, further comprising:
   before step i), determining which buses of the plurality of buses that the first bus is definitely not connected to; and
   minimizing the objective function using the determination of which buses of the plurality of buses that the first bus is definitely not connected to as a linear equality constraint of the minimization of the objective function or to reduce a number of variables of the minimization of the objective function.

8. The method of claim 1, further comprising:
   before step i), determining which buses of the plurality of buses have known admittances; and
   using the known admittances as a linear equality constraint of the minimization of the objective function or to reduce a number of variables of the minimization of the objective function.

9. The method of claim 1, further comprising:
   before step i), determining a bus of the plurality of buses that has a first-most number of connections to other buses of the plurality of buses; and
   using the determined bus as the first bus, the determined bus being a non-zero power injection bus.

10. The method of claim 1, wherein:
    the power data measurements comprise power measurements and voltage phasor measurements of the electrical power grid.

11. The method of claim 10, wherein:
    minimizing the objective function comprises minimizing a norm of a difference between that of a) power measurements associated with the first bus, and b) a product of functions of voltage phasors associated with the first bus and the estimated conductances and susceptances associated with the first bus.

12. The method of claim 10, wherein:
    the power data measurements are generated using a plurality of phasor measurement units (PMUs) distributed throughout the electrical power grid.

13. The method of claim 1, wherein:
    repeatedly estimating the sum of conductances and susceptances connected to the first bus comprises:
    incrementing the estimated sum of conductances and susceptances connected to the first bus by a first step size before minimizing the objective function;

determining, upon minimizing the objective function, that an optimization error of the objective function has not increased; and incrementing the estimated sum of conductances and susceptances connected to the first bus by the first step size before minimizing the objective function a subsequent time.

14. The method of claim 1, wherein:

repeatedly estimating the sum of conductances and susceptances connected to the first bus comprises:

incrementing the estimated sum of conductances and susceptances connected to the first bus by a first step size before minimizing the objective function;

determining, upon minimizing the objective function, that an optimization error of the objective function has increased;

decrementing the estimated sum of conductances and susceptances connected to the first bus by the first step size; and incrementing the estimated sum of conductances and susceptances connected to the first bus by a second step size before minimizing the objective function a subsequent time, the second step size being less than the first step size.

15. The method of claim 14, wherein:

determining the minimum value of the objective function that corresponds to the maximum value of the estimated sum of conductances and susceptances for the first bus comprises:

determining that the second step size is less than a minimum step size.

16. The method of claim 1, further comprising:

determining, using the determined topology, that the topology of the electrical power grid has changed as compared to a previously determined topology of the electrical power grid.

17. The method of claim 1, further comprising:

adjusting a state of the electrical power grid based on a comparison of the determined topology to a previously determined topology of the electrical power grid.

18. The method of claim 1, wherein:

maximization of the estimated sum of conductances and susceptances connected to the first bus is a first linear constraint of the minimization of the objective function, a maximum of the estimated sum of conductances and susceptances corresponding to a lower bound of a maximum of an overall power that exits the first bus in a half cycle.

19. The method of claim 18, wherein:

maximizing the overall power that exits the first bus in a half cycle corresponds to maximizing an entropy production rate of the first bus in each cycle, the entropy production rate being maximum in a closed irreversible system in accordance with the Second Law of Thermodynamics.

20. A method comprising:

i) receiving power data measurements from a plurality of phasor measurement units (PMUs) at nodes of an electrical power grid, the electrical power grid having a plurality of buses;

ii) for a first bus of the electrical power grid, repeatedly minimizing, at an energy management system of the electrical power grid, an objective function using the received power data measurements to determine estimated admittances between the first bus and other buses of the plurality of buses, the minimization of the objective function being linearly constrained by a repeatedly estimated sum of conductances and susceptances connected to the first bus;

iii) determining, at the energy management system, a minimum value of the objective function that corresponds to a maximum value of the repeatedly estimated sum of conductances and susceptances for the first bus; and iv) determining, at the energy management system, a portion of a topology of the electrical power grid associated with the first bus based on the estimated admittances that correspond to the minimum value of the objective function and to the maximum value of the estimated sum of conductances and susceptances for the first bus; and v) repeating steps i through iv for each bus of the electrical power grid to determine the topology of the electrical power grid;

wherein:

the first bus is a non-zero power injection bus; and steps i through iv are repeated for each bus of the plurality of buses that is a non-zero power injection bus before steps i through iv are repeated for each bus of the plurality of buses that is a zero power injection bus.

21. The method of claim 20, further comprising:

adjusting, by the energy management system, a state of the electrical power grid based on the determined topology of the electrical power grid.

* * * * *